(12) United States Patent
Eland

(10) Patent No.: US 11,218,326 B1
(45) Date of Patent: Jan. 4, 2022

(54) SYSTEM AND METHOD FOR GENERATING CURRENT LIVE AND TEST VERSIONS OF DNS DATA FOR ROLLOVER

(71) Applicant: Afilias Limited, Dublin (IE)

(72) Inventor: Howard Eland, Horsham, PA (US)

(73) Assignee: AFILIAS LIMITED, Dublin (IE)

( * ) Notice: Subject to any disclaimer, the term of this patent is extended or adjusted under 35 U.S.C. 154(b) by 0 days.

(21) Appl. No.: 16/999,292

(22) Filed: Aug. 21, 2020

Related U.S. Application Data

(63) Continuation-in-part of application No. 16/920,076, filed on Jul. 2, 2020, and a continuation-in-part of application No. 16/930,393, filed on Jul. 16, 2020.

(51) Int. Cl.
| | |
|---|---|
| *H04L 12/00* | (2006.01) |
| *H04L 9/32* | (2006.01) |
| *G06F 16/21* | (2019.01) |
| *G06F 16/958* | (2019.01) |
| *H04L 29/12* | (2006.01) |
| *G06F 16/23* | (2019.01) |
| *H04L 29/06* | (2006.01) |

(52) U.S. Cl.
CPC .......... *H04L 9/3247* (2013.01); *G06F 16/219* (2019.01); *G06F 16/2365* (2019.01); *G06F 16/958* (2019.01); *H04L 61/1511* (2013.01); *H04L 69/16* (2013.01)

(58) Field of Classification Search
CPC ............. H04L 63/1416; H04L 41/0213; H04L 9/0825; H04L 9/3247
USPC ................... 709/245, 227; 713/176
See application file for complete search history.

(56) References Cited

U.S. PATENT DOCUMENTS

| | | | | |
|---|---|---|---|---|
| 9,130,917 | B2* | 9/2015 | Smith | H04L 9/321 |
| 9,479,422 | B2* | 10/2016 | Sundaresan | H04L 67/16 |
| 9,722,970 | B2* | 8/2017 | Prince | H04L 61/2007 |
| 9,749,307 | B2* | 8/2017 | Smith | H04L 9/3247 |
| 9,992,156 | B2* | 6/2018 | Tan | H04L 63/1416 |
| 10,097,504 | B2* | 10/2018 | Backholm | H04L 47/286 |
| 10,158,620 | B2* | 12/2018 | Smith | H04L 63/123 |
| 2017/0163425 | A1* | 6/2017 | Kaliski, Jr. | H04L 9/3247 |
| 2020/0084178 | A1* | 3/2020 | Dreyer | H04L 41/12 |
| 2021/0067377 | A1* | 3/2021 | Beck | H04L 61/1511 |

* cited by examiner

*Primary Examiner* — Frantz Coby
(74) *Attorney, Agent, or Firm* — Haynes and Boone, LLP

(57) ABSTRACT

A method for concurrently publishing a current version of a plurality of Domain Name System (DNS) records for zone of a domain name and for storing a next version of the plurality of DNS records for the zone, the method comprising the steps of: obtaining selected data of registry data associated with the domain name stored in a registry database; digitally signing the registry data to generate a first signed DNS record and digitally signing the registry data to generate a second signed DNS record; and a distribution system for coordinating concurrent generation and transmission of the current version and the next version; the distribution system and signing system cooperating to: a) generate the current version to include the first signed DNS record; and b) while the current version is operational in the DNS, generate the next version the second signed DNS record.

20 Claims, 12 Drawing Sheets

SYSTEM AND METHOD FOR GENERATING CURRENT LIVE AND TEST VERSIONS OF DNS DATA FOR ROLLOVER

CROSS-REFERENCE TO RELATED APPLICATIONS

This application is a continuation-in-part of U.S. patent application Ser. No. 16/920,076, filed Jul. 2, 2020, now pending, and a continuation-in-part of U.S. patent application Ser. No. 16/930,393, filed Jul. 16, 2020, now pending, each of which is incorporated herein by express reference thereto in its entirety.

FIELD

The present invention is related to DNS security.

BACKGROUND

The Domain Name System (DNS) is the part of the Internet infrastructure that translates human-readable domain names into the Internet Protocol (IP) numbers needed to establish TCP/IP communications over the Internet, for example TCP and UDP. That is, DNS allows users to refer to web sites, and other resources, using easier to remember domain names, such as "www.a.b.info," rather than the numeric IP addresses, which are machine readable addresses used by software to communicate with computers on the Internet. It should be noted that a single IP address, e.g., one assigned to a single server, can support numerous domain names. That is, different domain names may resolve to the same server, that can then determine what content to provide based on the requested domain name and/or additional non-domain information.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows, in part, for users to be directed to a desired domain by a lookup process whereby the user enters the desired domain, and the DNS returns appropriate IP addresses. During the DNS resolution process, a request for a given domain name is routed from a resolver (e.g. a stub resolver) to an appropriate server (e.g. a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers.

Although the distributed nature of the DNS provides significant advantages in terms of the efficiency of the overall system it also makes the system vulnerable to certain types of malfunctions and/or attacks at various nodes in the system. One particular problem that can occur is referred to as DNS cache poisoning. DNS cache poisoning occurs when data is introduced into a DNS name server's cache database that did not originate from authoritative DNS sources. This may result from deliberate attacks on a name server, or it may be an unintended result of, for example, a misconfigured DNS cache or improper software design of a DNS applications. Thus, DNS cache poisoning can result in (1) resolution requests failing, such as when inaccurate or misconfigured IP address information is provided, or (2) a requesting user's resolution request being directed to a malicious site that spoofs the genuine domain and is used to illicitly obtain information such as account passwords, or to distribute malicious content, such as computer worms or viruses, that are delivered to the requesting user.

The Domain Name System Security Extensions (DNSSEC) is a suite of Internet Engineering Task Force (IETF) specifications for securing certain kinds of information provided by the DNS as used on IP networks. DNSSEC provides for the signing of DNSSEC-ready zones, ensuring origin authentication and data integrity for DNS data, as well as authenticated denial of existence. In general, answers provided within DNSSEC are digitally signed, and, by checking the digital signature, a DNS resolver is able to check if the information corresponds to the information on the authoritative DNS server. DNSSEC uses public-key cryptography for the digital signatures and authentication. The DNSKEY record is authenticated via a chain of trust, starting with a set of verified public keys for the DNS root zone, which is a trusted third party.

To implement DNSSEC, several new DNS record types were created or adapted to use with DNSSEC, including RRSIG, DNSKEY, DS, NSEC, NSEC3 and NSEC3PARAM. For example, when DNSSEC is used, each authoritative answer to a DNS lookup will contain an RRSIG DNS record in addition to the record type that was requested. The RRSIG record is a digital signature of the answer DNS resource record set. The digital signature can be verified by locating the correct public key found in a DNSKEY record. The DS record is used in the authentication of DNSKEYs in the lookup procedure using the chain of trust. NSEC and NSEC3 records are used to provide the authenticated denial of existence responses for DNS records that do not exist. The requirements of DNSSEC involve the use of different keys, stored both in DNSKEY records and from other sources to form trust anchors. There are, for example, Key Signing Keys (KSKs), which are used to sign other DNSKEY records, and Zone Signing Keys (ZSKs), which are used to sign other records. Because the ZSKs are under the control and use of a specific DNS zone, they can be switched more easily and more often. As a result, ZSKs can generally be much shorter (in terms of byte length) than KSKs, while still offering an acceptable level of protection.

However, with the introduction of DNSSEC into vast registries, such as the .info registry, inefficiencies in the various signing techniques for DNSSEC data, particularly with respect to large zones, bring the potential for resolution problems including delays and resolution failures. Such problems can have significant detrimental effects on e-commerce and other high-traffic sites. Further, the ability to properly utilize storage, connection and/or computing resources of DNS components for publication of DNS records in the DNS is considered suboptimal in today's DNS environment.

Further, testing of registry data obtained from registries is not tested before DNS data is generated and subsequently published to the DNS infrastructure, during the process of implementing key/algorithmic rollovers. Accordingly, desired is a system that can quickly and efficiently generate and publish DNS data to the DNS, based on received registry data and updates thereto.

SUMMARY

The present invention may advantageously provide a system and/or method to obviate or mitigate at least one of the above presented disadvantages.

A first aspect provided is a method for concurrently publishing a current version of a plurality of Domain Name System (DNS) records for zone of a domain name and for storing a next version of the plurality of DNS records for the zone, the method comprising the steps of: obtaining selected data of registry data associated with the domain name stored in a registry database; digitally signing the registry data to generate a first signed DNS record using a first signing key (SK1) and digitally signing the registry data to generate a second signed DNS record using a second signing key SK2, the SK1 different from the SK2; and a distribution system for coordinating concurrent generation and transmission of the current version and the next version; the distribution system and signing system cooperating to: a) generate the current version to include the first signed DNS record according to a first set of generation instructions and transmit the current version to one or more authoritative servers of the DNS in a first transmission path that bypasses storing of the current version in the registry database; and b) while the current version is operational in the DNS, generate the next version the second signed DNS record according to a second set of generation instructions and transmit the next version to a publication storage in a second transmission path that bypasses storing of the next version in the registry database; wherein the current version in the DNS and the next version in the publication storage contain different versions of at least some of the plurality of DNS records by using SK1 in the current version and SK2 in the next version.

A second aspect provided is a system for concurrently publishing a current version of a plurality of Domain Name System (DNS) records for a zone of domain name and for storing a next version of the plurality of DNS records for the zone, the system comprising: a record selection module for obtaining registry data associated with the domain name stored in a registry database; a DNS Security (DNSSEC) signing system having one or more signing modules for digitally signing the registry data to generate a first signed DNS record using a first signing key (SK1) and digitally signing the registry data to generate a second signed DNS record using a second signing key SK2, the SK1 different from the SK2; and a distribution system for coordinating concurrent generation and transmission of the current version and the next version; the distribution system and signing system cooperating to: generate the concurrent version using SK1 to include the first signed DNS record according to a first set of generation instructions and transmit the concurrent version to one or more authoritative servers of the DNS in a first transmission path that bypasses storing of the current version in the registry database; and while the current version is operational in the DNS, generate the next version using SK2 to include the second signed DNS record according to a second set of generation instructions and transmit the next version to a publication storage for at least one of testing or validation by a processing facility in a second transmission path that bypasses storing of the next version in the registry database; wherein the current version in the DNS and the next version in the publication storage contain different versions of at least some of the plurality of DNS records by using SK1 in the current version and SK2 in the next version.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Figure 1:
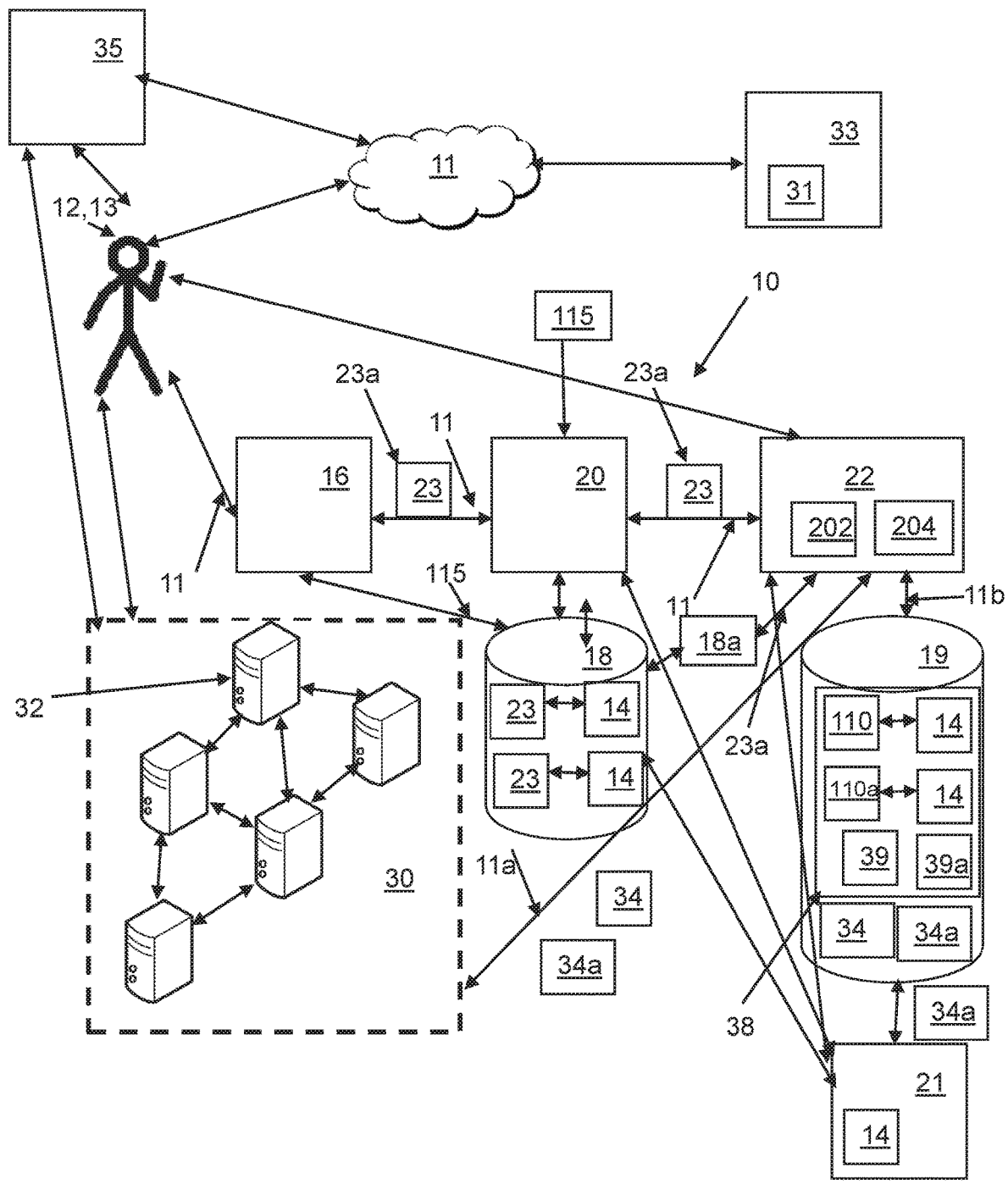
FIG. 1 is a block diagram of components of a DNS publication system.

Referring to FIG. 1, shown is a Domain Name System (DNS) publication system 10 for coordinating and publishing DNS records (e.g. DNS data 34 including one or more Resource Record sets—RR sets) in a DNS 30 containing DNS servers 32 (e.g. Authoritative servers). As further described below, the DNS servers 32 provide DNS services for users 13 of network 11 (e.g. Internet) resources 31 (e.g. as provided by a plurality of distributed web servers 33, mail servers 33, etc., as coordinated through various domain names 14 of the network 11). It is recognized that network resources 31 can be provided by one or more registry operators 20 (e.g. via registry databases 18), including external links to mail servers and/or other websites based on web page return results. The distributed servers 33 can rely upon one or more resolver servers 35, by which the network user 13 ultimately accesses network resources 31 via the DNS 30. The publication system 10 can be used for concurrently generating a live/current version DNS data 34 and a test/next version DNS data 34*a*, e.g. both DNS data 34,34*a* containing different DNS zone/record versions (associated with different key groups SK1, SK2) using the registry data of the domain name, with an option to inhibit publication of the next version DNS data 34*a* until testing/validation of the DNS data 34*a* is successful. Once tested/validated satisfactorily, the next DNS data 34*a* is used by the publication system 10 to replace the DNS data 34 in the DNS 30 as update DNS data 34*b*, as further described below. It is recognised that the next version DNS data 34*a* is generated in an iterative fashion (see FIGS. 9*a-c*), intersperse with hold down periods 902. As such, the next DNS data 34*a* is actually subdivided up into a number of intermediate iterative version 34*a'*, 34*a"*, 34*a'''*, 34*a''''*, 34*a'''''*, as the case dictates.

The DNS publication system 10 can be utilized by a registrant 12 (e.g. user 12), either directly or via the registrar 16 for example, to publish the DNS data 34 (e.g. signed and/or unsigned DNS records) associated with the domain name(s) 14 owned by the registrant 12. As further described below, the DNS data 34 is published (e.g. distributed to the various DNS servers 32) via a DNS publication service 22, also referred to as a registry service provider 22. Also as further described below, the DNS publication service 22 is configured to facilitate the sending of signed DNS data 34 to the DNS 30, depending upon the configuration (e.g. using a signing identifier 110) of the domain name 14 of the registrant 12. Further, the DNS data 34 generated can be performed concurrently, i.e. a first set of DNS data 34 is live in the DNS 30 while a second set of DNS data 34a can be sent to publication storage 19 for testing/validation, via network path 11b. Each of the DNS data 34,34a would contain signed DNS records 26 (SR) and optionally one or more unsigned DNS records 26 (USR), see FIGS. 6a,b. Based on a publication identifier 39, a decision can be made by the publication system 22 whether to publish the set of DNS data 34,34a generated (e.g. to replace the version DNS data 34 in the DNS 30 with a newly generated DNS data as update data 34b) vi network path 11a, or to store the DNS data 34,34a generated (e.g. in publication storage 19) and thus conduct testing/validation on the stored DNS data 34a before being provided as the update DNS data 34b (for use in replacing the version DNS data 34 in the DNS 30) via network path 11b.

In other words, the DNS publication service 22 can generate the two sets of DNS data 34,34a from the resource record(s) 26 obtained from the registry database 18, using different signing keys (SK—e.g. SK1 and SK2—see FIG. 6b), in order to facilitate a key rollover by having the current version DNS data 34 be utilized by the resolver servers 35 in the DNS 30 while at the same time perform test/validation procedures on the next version DNS data 34a in the publication storage 19 (as iteratively performed using at least one intermediate version 34a', 34a'', 34a''', 34a'''', 34a'''''). It is recognized that the resolver servers 35 of the DNS 30 do not have access to the next version DNS data 34a (resident in the publication storage 19) until testing/validation is completed successfully (as iteratively performed using at least one intermediate version 34a', 34a'', 34a''', 34a'''', 34a'''''). It is also recognized that both signing keys SK1, SK2 (for example in the same key group) can be used to sign the DNS data 34a, in order to facilitate a key rollover process. Once the DNS data 34a (as iteratively performed using at least one intermediate version 34a', 34a'', 34a''', 34a'''', 34a''''') is finished the requisite stage of testing/validation, the publication system 22 can then decide (via the publication identifier 39a) to publish the DNS data 34a (as iteratively performed using at least one intermediate version 34a', 34a'', 34a''', 34a'''', 34a''''') to the DNS 30, including as final update DNS data 34b via a network transmission path 11a.

Figure 8:
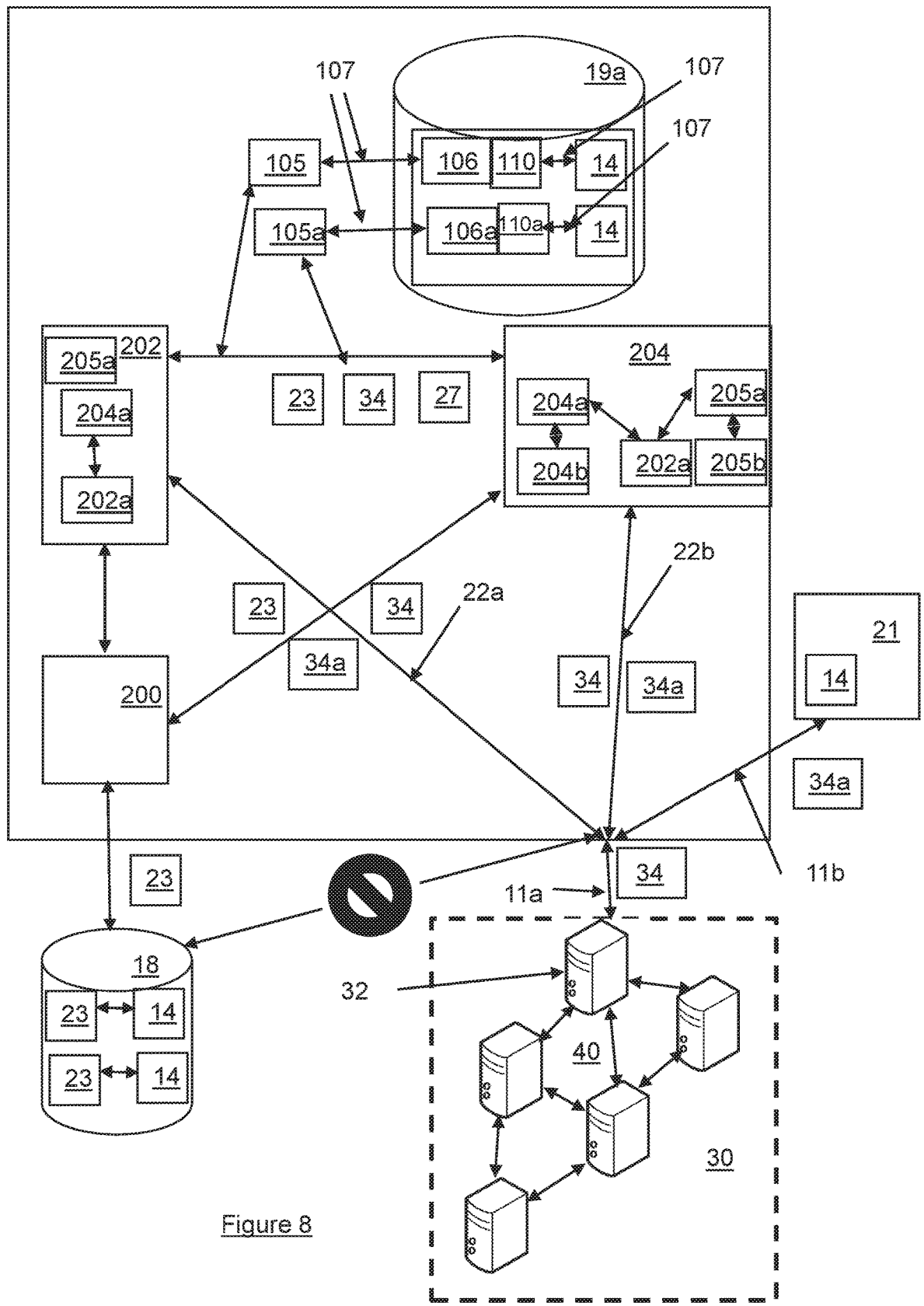
FIG. 8 is a further embodiment of the DNS publication system of FIG. 3.
Figure 9A:
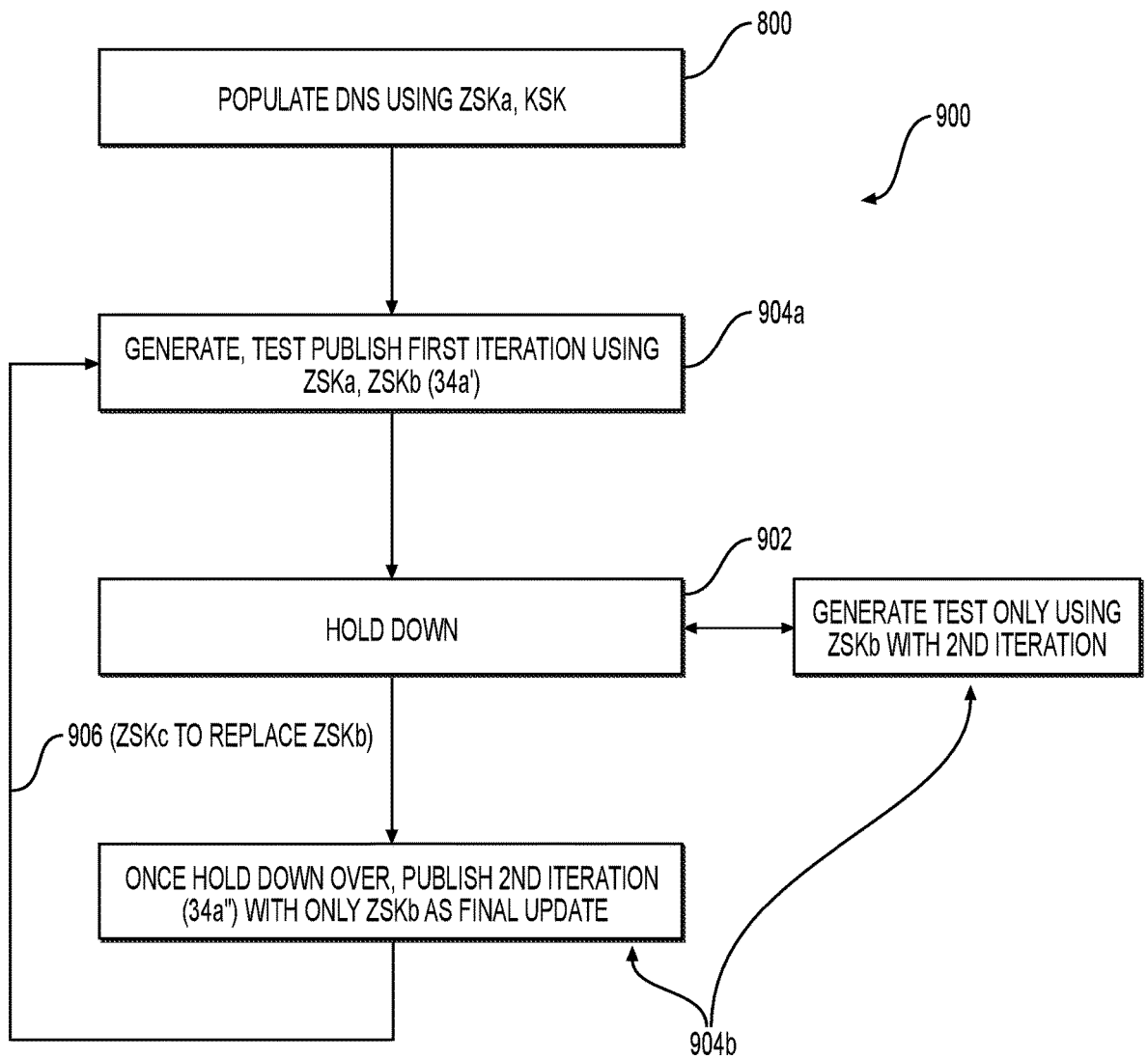
FIGS. 9*a,b,c* show example stages of testing/validation depending on the type of key rollover implemented.

Referring to FIG. 8, shown is an alternative embodiment of the signing system 204, containing different DNS record generation modules 204a, 205a and different signature modules 204b, 205b. Referring to FIGS. 9a,b,c, shown are the various stages 900 for implementing a key rollover process (as iteratively performed using at least one intermediate version 34a', 34a'', 34a''', 34a'''', 34a'''''). As shown, and further descried below, each of the stages 900 is separated from another stage 900 by hold down period 902, in order to provide the resolver servers 35 and other DNS 30 infrastructure to propagate the changes included in the published DNS data to all requisite entities in the DNS 30. For example, FIG. 9a describes staged publication of the next DNS data 34a for a Zone Signing Key (ZSK) rollover. For example, FIG. 9b describes staged publication of the next DNS data 34a for a Key Signing Key (KSK) rollover. For example, FIG. 9c describes staged publication of the next DNS data 34a for an algorithmic (e.g. cryptographic scheme) change/rollover.

As further described below, the first set of DNS data 34 (e.g. version DNS data 34) can contain signed DNS records using a first signing key (SK1) and the second set of DNS data 34a (e.g. the next version DNS data 34a) can contain signed DNS records using a second signing key (SK2), such that signing key SK1 and signing key SK2 are terms used to generically describe different keys from different key groups (e.g. respectively a first key group and a second key group—for example implemented on the same or different signing modules 204a, 204b, 205a, 205b—see FIG. 8). It is recognized that in the case of different signing modules 204a, 204b, 205a, 205b, preferably each of the signing modules 204a, 204b, 205a, 205b would have the same private portion of the chosen cryptographic scheme used to generate the signing keys SK1, SK2. An advantage of utilizing the DNS publication service 22 to generate a pair of DNS data 34,34a concurrently is where the DNS publication system 22 decides to convert the zone (containing the domain name 14) from a signed zone using a first signing key SK1 to a signed zone using a second signing key SK2. For example, the first signing key SK1 and the second signing key SK2 can be implemented using different signing algorithms and/or key technologies. As such, the domain name 14 can continue to be operated as a signed domain (using first signing key SK1) while concurrently generating a signed version of the domain (e.g. using second signing key SK2 in combination with SK1 to facilitate the key rollover) for testing purposes.

It is recognized, as further described below, that the DNS data 34 is considered a first "signed" version of the DNS record(s) 26 (see FIG. 2) that the DNS data 34 contains and the DNS data 34a (as iteratively performed using at least one intermediate version 34a', 34a'', 34a''', 34a'''', 34a''''') is considered a second "signed" version of the DNS record(s) 26 that the DNS data 34a contains, such that the DNS data 34a may contain one or more signed DNS records 26 that are absent from the DNS data 34. Alternatively, the DNS data 34a contains, such that the DNS data 34a may contain one or more signed DNS records 26 that are also contained in the DNS data 34, however the signature records 26a in each of the DNS data 34,34a may contain signatures using different signing keys SK1,SK2, e.g. the signature records 26a of the first DNS data 34 would be done using the first signing key(s) SK1 and the signature records 26a of the second DNS data 34a would be done using the second signing key(s) SK2. Each of the signed DNS data 34,34a would be for the same signed zone (i.e. contains one or more DNSSEC related records 26) according to the different DNSSEC related generation instructions (e.g. DNSSEC related generation instructions 105,105a—see FIG. 3).

Figure 9B:
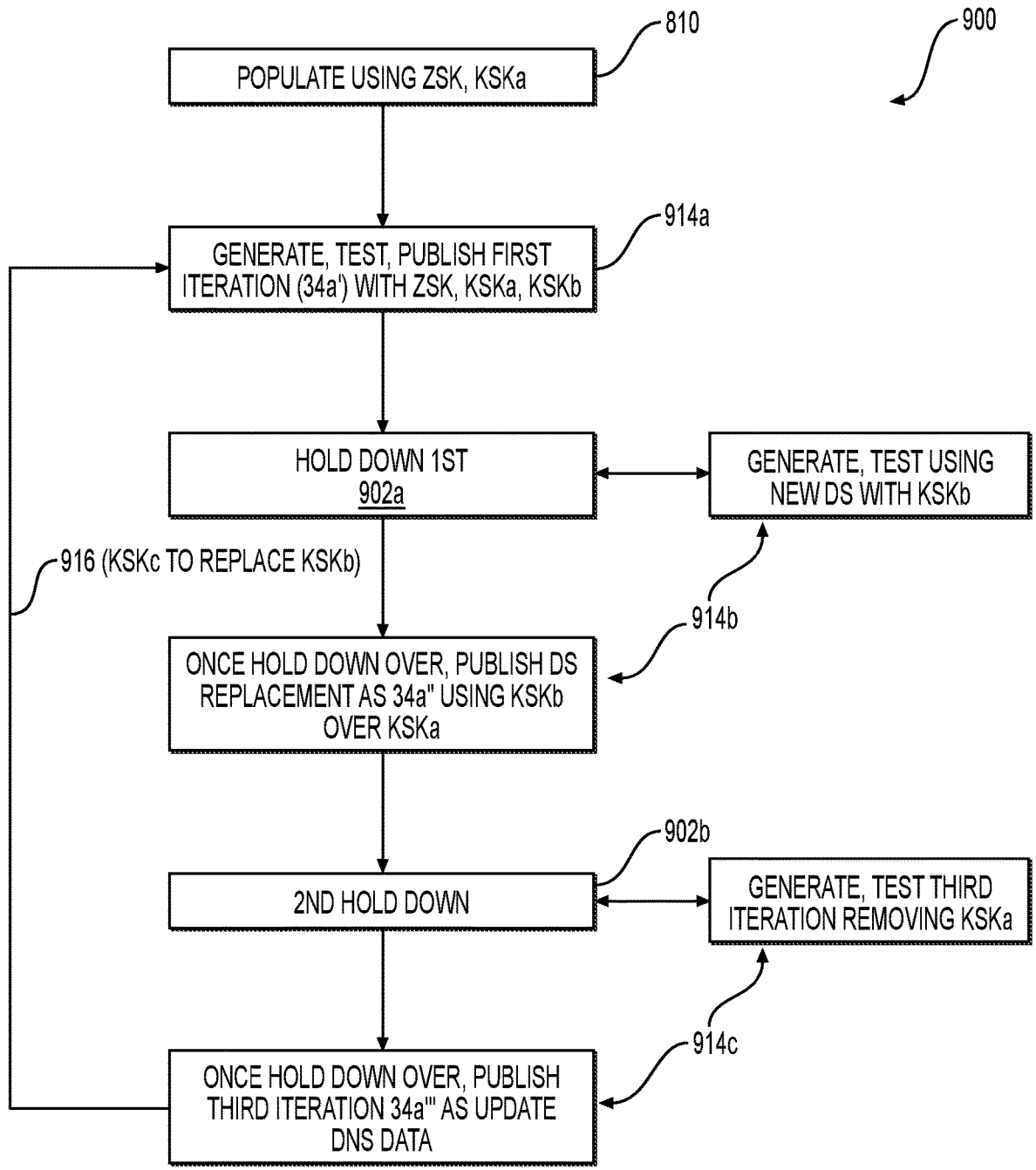
Figure 9C:
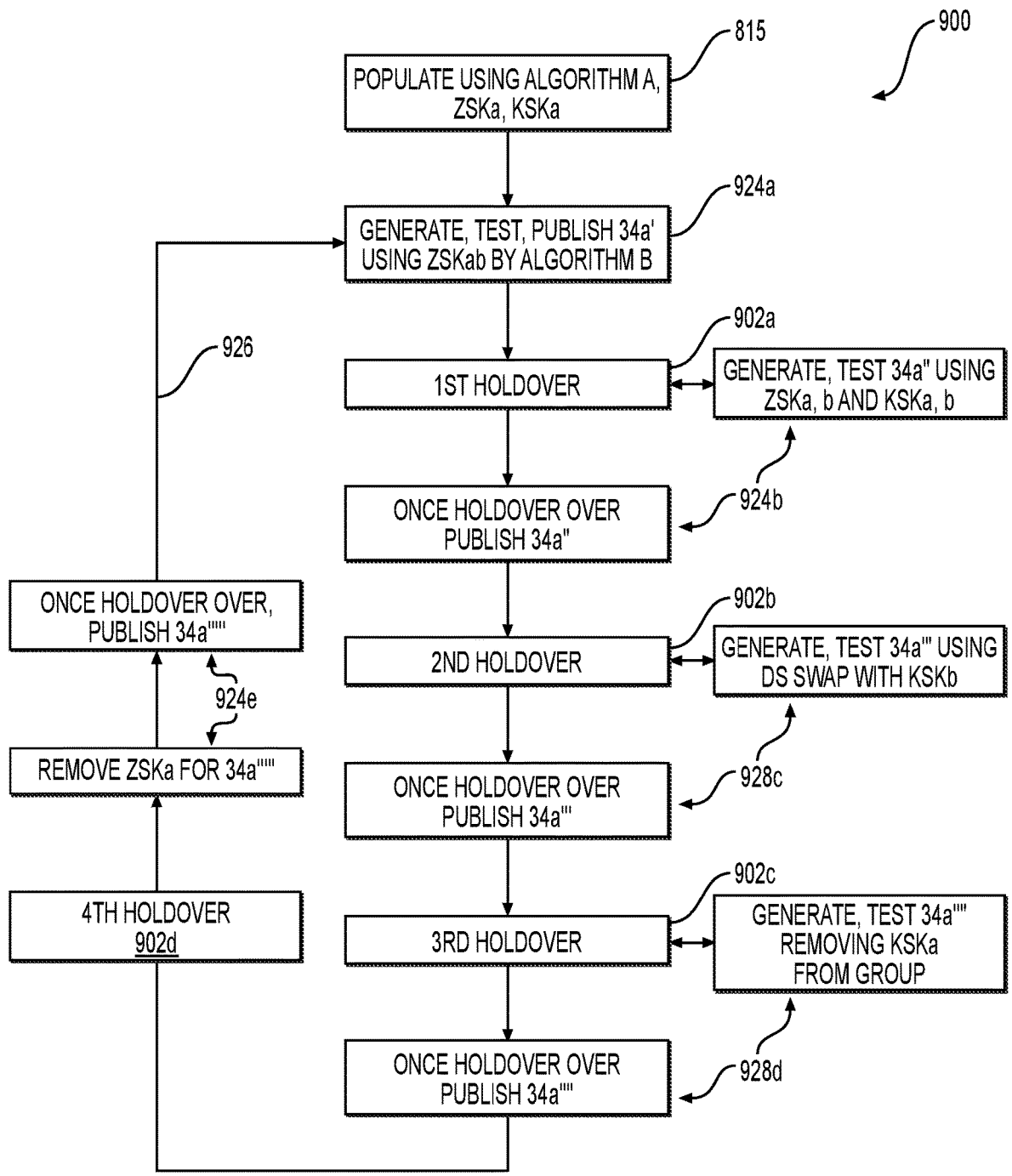

In one example (see FIGS. 9a, b, c also including a Key Signing Key KSK), SK1 can refer to a first ZSK1-first KSK group and SK2 can refer to a second ZSK2-second KSK2 group. Depending on the desired changes to the DNSKEYs (to go from current version DNS data 34 to update version DNS data 34b—as iteratively performed using at least one intermediate version 34a', 34a'', 34a''', 34a'''', 34a'''''), changes can be performed to the signatures, the ZSK, the KSK, and/or the specific cryptographic algorithm used to generate the RRSIG record sets 26a. FIG. 9a describes an example ZSK rollover process, such that the DNSKEY group contains a ZSK and a KSK. FIG. 9b describes an example KSK rollover process, such that the DNSKEY group contains a ZSK and a KSK. FIG. 9c describes an example cryptographic algorithm rollover process, such that the DNSKEY group contains a ZSK and a KSK. It is also recognized that the DNSKEY group could contain only a single key KSK, i.e. no ZSK is utilized in the DNS data 34 of the DNS 30. Accordingly, the single DNS key (e.g. a KSK like key) would be used to sign all of the zone including itself.

For example, the DNS publication service 22 could have an identifier table 38 (stored in a publication database 19), providing the key identifier 110,110a (e.g. signed via SK1 or signed via SK2) as well as the publication identifier 39,39a (e.g. for publication or publication restriction for a particular DNS data 34,34a) associated with each of the domain names 14. Further, it is recognized that the DNS publication service 22 is responsible for receiving the registry data 23 of the domain name 14 (e.g. as obtained from the domain name registry 18 database) and then using the obtained registry data 23 to generate the DNS data 34,34a. The DNS data 34,34a can then be transmitted directly to the DNS 30 (i.e. published to the DNS servers 32) in the network transmission path 11a that bypasses the domain name registry 18 database. In other words, the generated DNS data 34,34a is not returned/stored to/in the domain name registry 18 database once generated, rather the generated DNS data 34,34a is sent by the DNS publication service 22 directly over the network path 11a to the plurality of DNS servers 32 associated with the domain name 14 (e.g. as administered by the DNS publication service 22). Therefore, it is recognized that each time that new DNS data 34,34a is to be generated, the associated registry data 23 are obtained by the DNS publication service 22 for use in generating and then transmitting of the resultant DNS data 34,34a over the transmission path 11a. Further, the DNS data set 34,34a designated as "publication restriction" is stored in the publication storage 19 (i.e. not in the domain name registry 18 database) for subsequent operational testing (e.g. not accessible by the users 12 over the network 11) of the domain using the stored DNS data set 34,34a. Meanwhile, the transmitted DNS data set 34,34a designated as "publication" is used by the DNS servers 32 in order to operate the domain (of the domain name 14) for network 11 access by the users 12 (e.g. to gain access to the network resources 31 using the DNS services provided by the DNS servers 32 of the DNS 30). It is recognized that one of the DNS data 34,34a is sent to the DNS 30 while the other of the DNS data 34,34a is sent to the publication storage 19, e.g. as accessed by the testing service 21 (as iteratively performed using at least one intermediate version 34a', 34a'', 34a''', 34a'''', 34a''''').

In this manner, the registrant 12 can continue to utilize/manage their domain name 14 using the first signing key SK1 (via the DNS servers 32 using the DNS data 34) while simultaneously testing is performed on the zone of their domain name 14 using the second signing key SK2 (via production facilities/servers 21) in interacting with stored DNS data 34a of the publication storage 19 (as iteratively performed using at least one intermediate version 34a', 34a'', 34a''', 34a'''', 34a'''''), as per the various example stages 900 and hold down period(s) 902. For example, the production/testing facilities 21 can use the stored DNS data 34a to replicate selected DNS operations implemented (as shared with the production facilities 21 by the DNS 30 and/or the registry operator 20 by example) with respect to the domain name registry 18 database and/or the live DNS 30.

In terms of key rollover process, ultimate replacement of the version DNS data 34 with the test completed update DNS data 34b (the resultant DNS data of the tested/validated DNS data 34a) is done in the stages 900, depending upon the type of key rollover process being implemented. As shown by example in FIGS. 9a,b,c, the hold down period(s) 902 separate the various stages 900 from one another, such that each of the stages 900 contains a respective iterative form (e.g. intermediate version DNS data 34a', 34a'', 34a''', 34a'''', 34a''''') of the next version DNS data 34a.

For example, in FIG. 9a for a ZSK rollover, shown are stage 904a separated by stage 904b by a hold down period 902. As a resultant of stage 904a, the DNS publication system generates, tests and then publishes a first iteration DNS data 34a'. As a resultant of stage 904b, the DNS publication system generates, tests and then publishes a second iteration DNS data 34a'' (also referred to as the update DNS data 34b in this case), as there may be only one hold down period 902 separating the publishing of the first iteration DNS data 34a' from the second iteration DNS data 34a''. In this case, the second iteration DNS data 34a'' is the final version of the DNS data 34a, thus referred to ultimately as the update DNS data 34b. Once the update DNS data 34b is published to the DNS 30, the testing/validation is considered completed for the next version DNS data 34a and the key/algorithm rollover process (changing from SK1 to SK2) is complete (e.g. all utilization of SK1, the signatures resulting therefrom, and optionally the DS record related to SK1 in the parent zone in the DNS 30 are erased). Further described below are details concerning the key/signature contents of the DNS data 34a, 34a', 34a'', 34b, for each of the cases concerning FIGS. 9a,b,c. It is recognized that publication of the second iteration DNS data 34a'' could only occur after the hold down period 902 is completed.

Figure 6A:
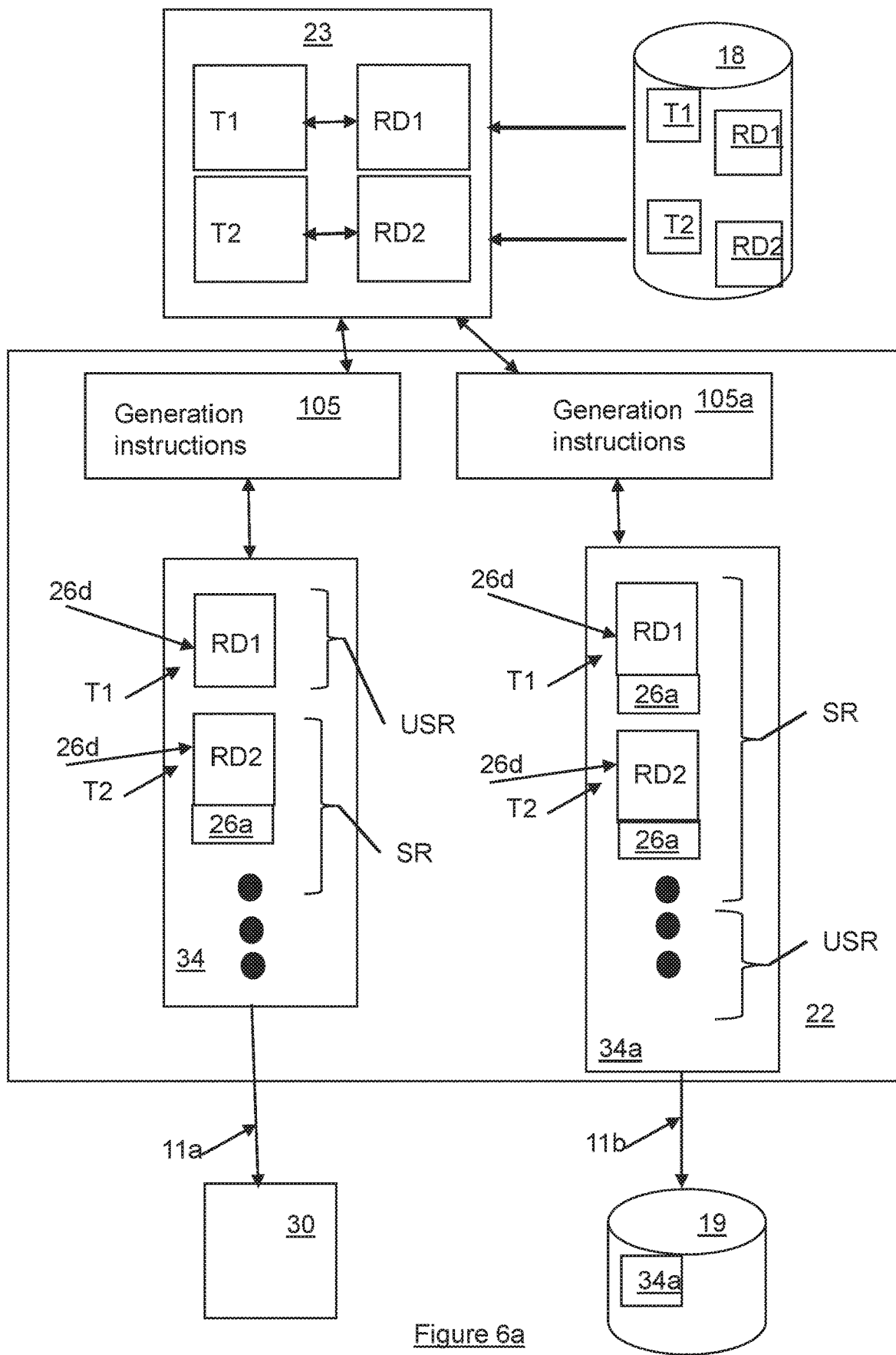
FIGS. 6*a,b* show example block diagrams for different operational embodiments of the DNS publication system of FIG. 3.

In one embodiment, see FIG. 6a, it is recognized that the considered first signed version (the DNS data 34) can be a signed domain optionally including one or more unsigned resource record types 26c, e.g. type T1 for registry data RD1, such that selected resource record type T1 of the DNS data 34 is defined as unsigned records USR in the generation instructions 105. Further, the DNS data 34 can also contain signed records SR for other registry data RD2 for a different record type T2, such that the resource record type T2 of the DNS data 34 is defined as signed records SR in the generation instructions 105. Similarly, the considered second signed version (the DNS data 34a—as iteratively performed using at least one intermediate version 34a', 34a'', 34a''', 34a'''', 34a''''') can also be a considered signed domain, including one or more signed resource record types 26c, e.g. types T1, T2, however optionally the difference being that the selected resource record type T1 in the DNS data 34 (defined as unsigned) is defined as a signed type T1 in the generation instructions 105a for the DNS data 34a (as iteratively performed using at least one intermediate version 34a', 34a'', 34a''', 34a'''', 34a'''''). In this embodiment, DNS data 34 contains unsigned resource records USR (e.g. RR set 26d) corresponding to selected registry data RD1 (pertaining to a specified type T1 in the generating instructions 105 for the DNS data 34), while the DNS data 34a contains signed resource records SR corresponding to the same selected registry data RD1 (pertaining to the same specified type T1 in the generating instructions 105 for the DNS data 34). Hence the generating instructions 105 for the specified type T1 designate as unsigned for the DNS data 34 associated with the registry data RD1, while the generating instructions 105a for the same specified type T1 designate as signed for the DNS data 34a associated with the registry data RD1. As such, it is also recognized that the signing module(s) 204b, 205b may each use respective different signing key(s) SK1, SK2 in order to generate the signature for the signature record(s) 26a. It is also recognized that each signing module(s) 204b, 205b could utilize the same signing keys for redundancy purposes, for example.

Figure 6B:
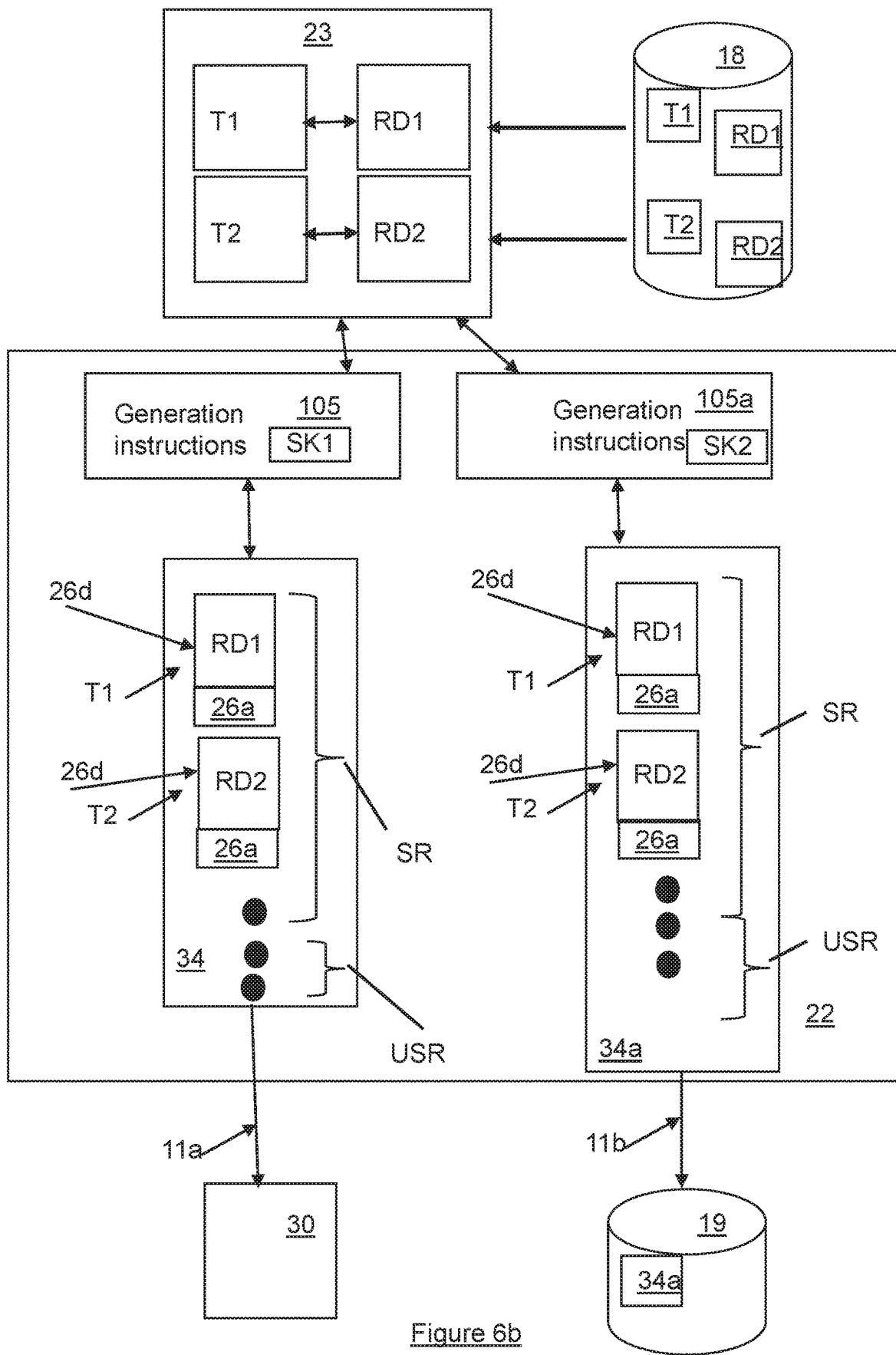

In one further embodiment, see FIG. 6b, it is recognized that the considered first signed version (the DNS data 34) can be a signed domain including one or more unsigned resource record types 26c. Further the resource record types, e.g. type T1 for registry data RD1, such that selected resource record type T1 of the DNS data 34,34a is defined as signed records SR in the generation instructions 105. Further, the DNS data 34,34a can also contain signed records SR for other registry data RD2 for a different record type T2, such that the resource record type T2 of the DNS data 34,34a is defined as signed records SR in the generation instructions 105. Similarly, the considered second signed version (the DNS data 34a) can also be a considered signed domain, including one or more signed resource record types 26c, e.g. types T1, T2, however optionally the difference being that the selected resource record type T1, T2 in the each of pair of DNS data 34,34a versions are signed using the different signing key(s) SK1,SK2, respectively. Hence the generating instructions 105,105a for the specified type T1, T2 designate as signed for the DNS data 34,34a associated with the registry data RD1, RD2. As such, it is also recognized that the signing module(s) 204b, 205b each use respective different signing key(s) SK1, SK2 in order to generate the signature for the signature record(s) 26a, as implemented using the various stages 900 and hold down period(s) 902. It is recognized that once provided as the final version update DNS data 34b, only one key group SK2 is used to implement the signatures for the specified record types T1,T2 in the update DNS data 34b (as published via the network path 11a to the DNS 30).

In view of the above presented embodiments (see FIGS. 6a,b), it is considered that the DNS data 34a contains RR set(s) 26d having signatures (e.g. signature record(s) 26a) that are not contained in the DNS data 34 for a particular resource record type 26c. Further, the DNS data 34 and the DNS data 34a can contain both signed records SR and/or unsigned records USR, depending upon the definition of resource record types 26c in the corresponding generation instructions 105,105a. It is also recognized that for generation instructions 105,105a containing signing instructions (e.g. specifying the use of the one or more signature modules 204b—see FIG. 3—for selected resource types 26c), these signing instructions would also contain definitions of different key records (e.g. in the different key groups SK1, SK2) for the respective zone apex.

In terms of how the DNS publication service 22 determines which of the DNS data 34 to send to the DNS 30 and which of the DNS data 34a (as iteratively performed using at least one intermediate version 34a', 34a'', 34a''', 34a'''', 34a''''') to send to the publication storage 19, a publication identifier 39 can be utilized. For example, based on the publication identifier 39,39a, a decision can be made whether to publish one of the sets of DNS data 34,34a and store (e.g. in publication storage 19) the other of the sets of DNS data 34,34a. In other words, the DNS publication service 22 can generate concurrently two sets of DNS data 34,34a from the same selected data (e.g. registry data RD1,RD2, etc.) obtained from the registry data 23 (i.e. data for storing in the registry database 18 used to defined the one or more domain names 14, as maintained/implemented by the registry operator 20 for providing the network resources 31), and then decide (via the publication identifier 39) which one of the two sets of DNS data 34,34a (either set 34 or set 34a) to transmit via the network transmission path 11a.

Once the DNS publication service 22 receives the set of registry data RD1, RD2 and associated generating instructions 105,105a, the DNS publication service 22 can determine whether to send/publish the generated DNS data (to the DNS 30) or to retain the generated DNs data for testing/ validation (for storing in the publication storage 19), by utilizing a publication identifier 39. In other words, once received, the set of registry data RD1, RD2 could be intended for processing and subsequent publication in the DNS 30, thus bypassing the publication storage 19 and associated testing/validation thereof. The publication identifier 39 can be used to direct the DNS publication service 22 to publish the generated DNS data 34 or to inhibit publishing (withhold the generated DNS data 34a from the DNS 30) of the DNS data 34a and instead store the generated DNS data 34a for subsequent testing/validation. If the publication identifier 39 indicates that the DNS data (once generated) should be published, then the DNS publication service 22 would transmit the DNS data (e.g. the current version DNS data 34 or the updated version DNS data 34b) via a network transmission path 11a.

Accordingly, as noted herein, the generated resource records 26 and resultant/updated DNS data 34 (and any iterations 34a', 34a'', 34a''', 34a'''', 34a''''' thereof) are not stored in the registry database 18, rather the DNS data 34 (containing the signed/unsigned resource records 26 for use in implementing the operation of the DNS 30) are published directly to the DNS 30 using the transmission path 11a, while the next version DNS data 34a (and any iterations 34a', 34a'', 34a''', 34a'''', 34a''''' thereof) is stored directly in the publication storage 19 in a transmission path 11b that also preferably bypasses the registry database 18, while being tested. In other words, preferably, the publication storage 19 is separate from the registry database 18, such that that the publication storage 19 (containing the next version DNS data 34a) (and any iterations 34a', 34a'', 34a''', 34a'''', 34a''''' thereof while being tested) is not accessible by the resolver servers 35. Further, it is recognized that the DNS servers 32 of the DNS 30 do not have access (are inhibited) from accessing the stored next version DNS data 34a (and any iterations 34a', 34a'', 34a''', 34a'''', 34a''''' thereof), such that the next version DNS data 34a (and any iterations 34a', 34a'', 34a''', 34a'''', 34a''''' thereof) is not used to implement access to the network resources 31 by the DNS 30 (working in tandem with the resolver servers 35 operating in conjunction with the computing network devices of the users 12,13) until ultimately published after the respective hold down period 902 (see FIGS. 9a,b,c).

As discussed, in the event that testing/validating of the changes to the registry data 23 is desired, then the publication identifier 39 is used to signify whether the DNS publication service uses the transmission path 11a (sending the generated DNS data 34 directly to the DNS 30) or the transmission path 11b (sending the generated DNS data 34a directly to the publication storage 19 for subsequent testing/ validating (including iterations thereof) before potentially sending as updated version DNS data 34b to the DNS 30).

Figure 2:
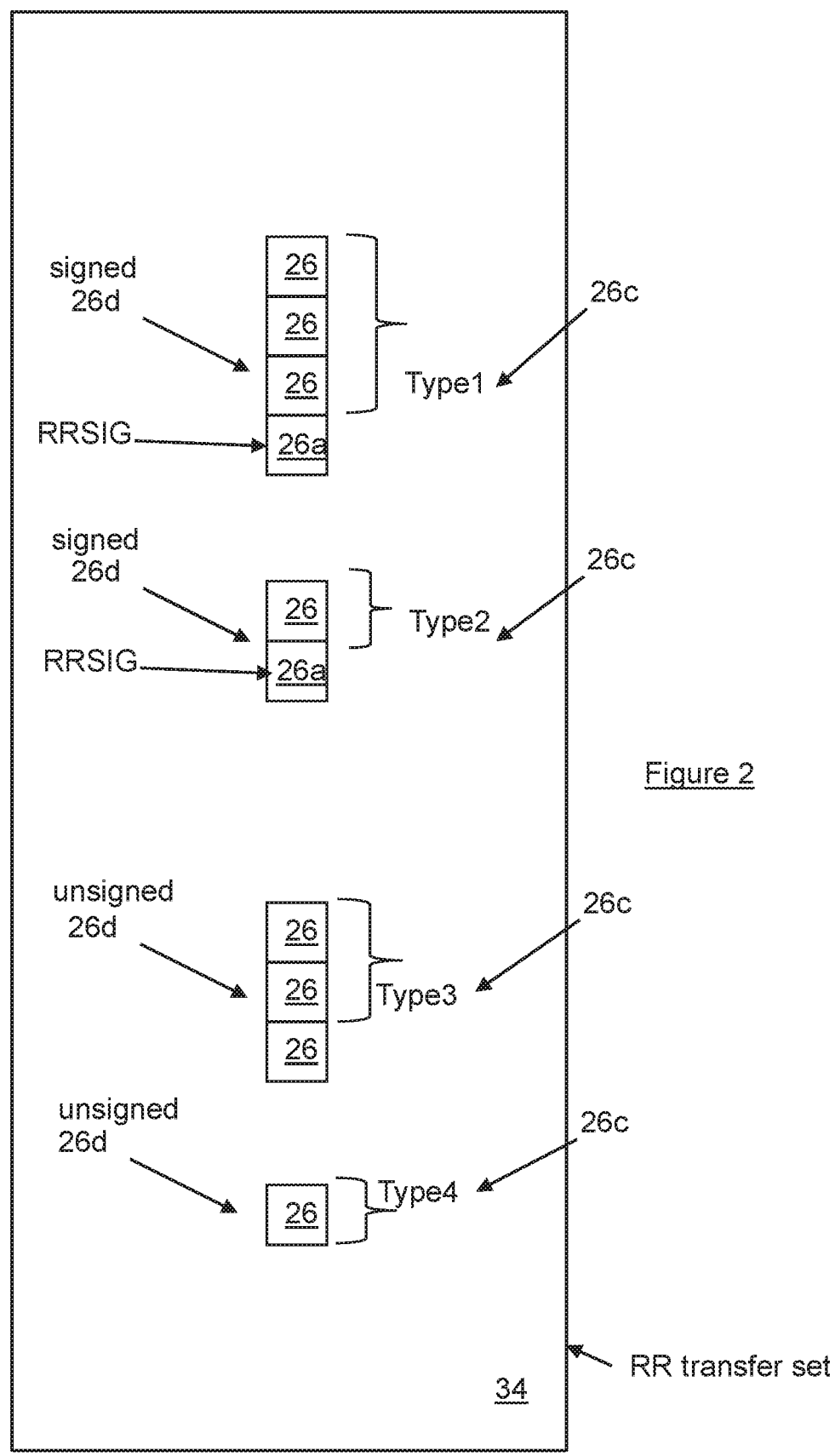
FIG. 2 is a block diagram of an example form of DNS data for the system of FIG. 1.
Figure 3:
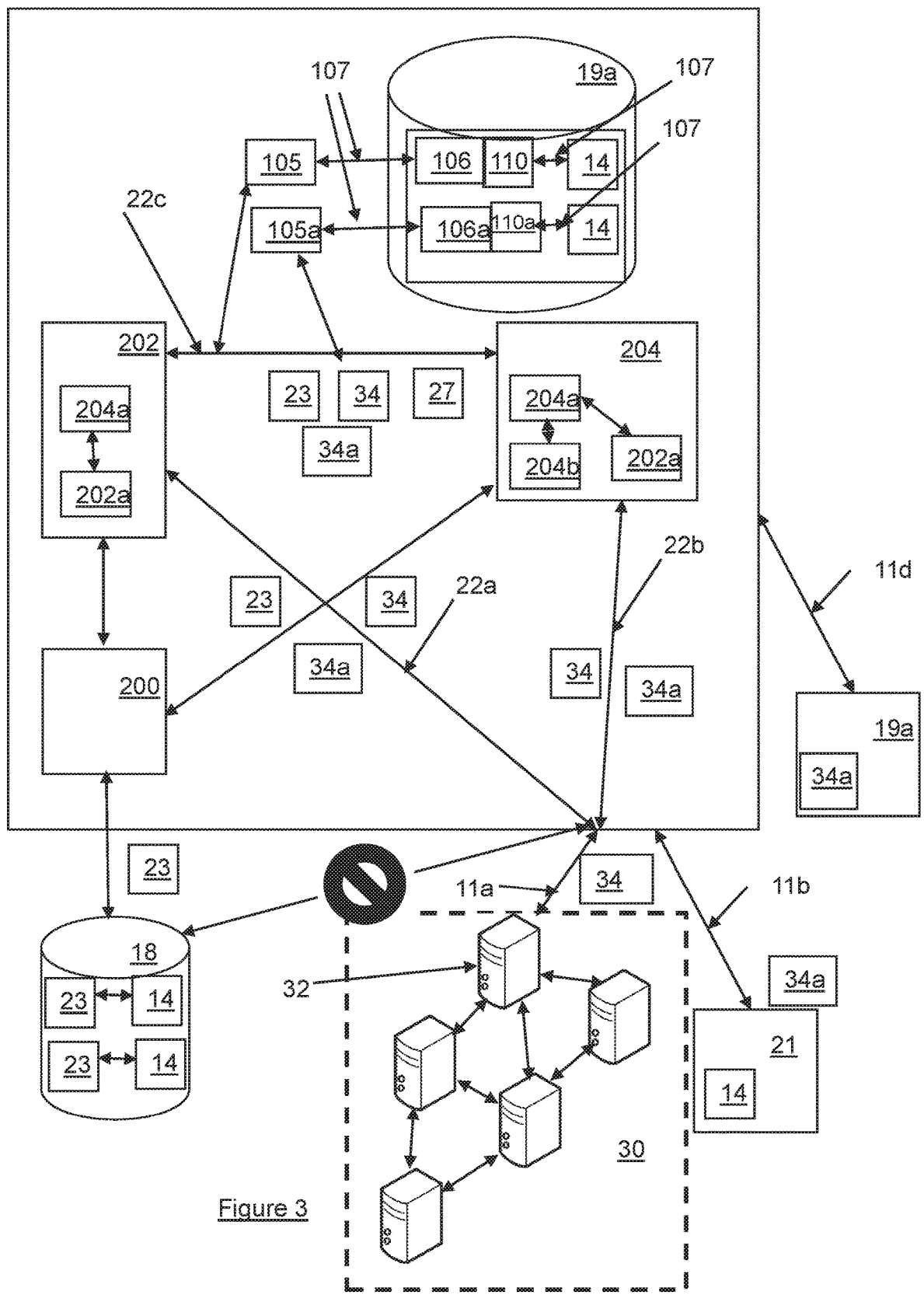
FIG. 3 is an example configuration of a DNS publication service for generating the DNS data of FIG. 2.

As recognized, depending upon the signing identifier(s) 110 associated with generating instructions 105 for the production/generation of the DNS data 34, see FIG. 3, the DNS publication service 22 can decide on how to transform the selected data (i.e. registry data 23) received into the corresponding DNS records of the DNS data 34 (e.g. signed SR or unsigned USR of an entire domain on a record type 26c by record type 26c basis—see FIG. 2). As recognized, depending upon the signing identifier(s) 110a associated with generating instructions 105a for the production/generation of the DNS data 34a, see FIG. 3, the DNS publication service 22 can decide on how to transform the selected data (i.e. registry data 23) received into the corresponding DNS records of the DNS data 34a (e.g. signed SR or unsigned USR of an entire domain on a record type 26c by record type 26c basis—see FIG. 2).

As further described below, the first set of DNS data 34 can contain one or more signed DNS records (defining a signed zone using first signing key(s) SK1) and the second set of DNS data 34a can contain one or more signed DNS records (e.g. all signed records or a mixture of signed and unsigned records as dictated by the generation instructions 105) defining a signed zone using second signing key(s) SK2. An advantage of utilizing the DNS publication service 22 to generate a pair of DNS data 34,34a (e.g. for the same or different selected data from the registry data 23) concurrently is where the DNS publication service 22 is considering converting the zone of the domain name 14 from the first signed zone to the second signed zone (using different sets of signing key(s) SK1,SK2). As such, the domain name 14 can continue to be operated as first signed domain while simultaneously generating the second signed next version of the domain for testing purposes (e.g. via testing facilities 21) concurrently with the first signed version operation of the domain via the DNS 30. As discussed, it is recognized that the next version DNS data 34a is generated/tested in different stages 900 (see FIGS. 9a,b,c by example), such that culmination of a respective stage 900 provides for publication of the respective iteration DNS data 34a', 34a", 34a'", etc. to the DNS 30 via the network path 11a.

As discussed, a current version operation of the DNS data is the DNS data 34 that is generated by the DNS publication system 22 and then transmitted/published to the DNS 30 for implementation by the DNS servers 32, in interaction with the resolver servers 35. This current version operation of the DNS data 34 is contrasted to the next version of the DNS data 34a. The next version DNS data 34a is that DNS data 34a generated by the DNS publication system 22 concurrently (as iteratively performed using at least one intermediate version 34a', 34a", 34a'", 34a"", 34a""') with the current version DNS data 34, however the next version DNS data 34a is not transmitted/published to the DNS 30 (for implementation by the DNS servers 32, in interaction with the resolver servers 35), rather the generated next version DNS data 34a is stored in the publication storage 19 (as iteratively performed using at least one intermediate version 34a', 34a", 34a'", 34a"", 34a""') for subsequent use in testing/validating the next version DNS data 34a while the current version DNS data 34 is actively utilized by the DNS 30. In this embodiment, the registrant 12 (for example) would use the DNS publication service 22 to change first signed DNS records SR in the DNS data 34 to second signed DNS records SR in the DNS data 34a (i.e. the DNS data 34 is the live version and the DNS data 34a is the test version). For sake of ease of description purposes only, the DNS data 34 is considered as the first signed DNS data 34 version (using the first signing key(s) SK1) and the next DNS data 34a is considered as the second signed DNS data 34a version (using the second signing key(s) SK2), as the DNS data 34a contains selected signatures in the same signature records 26a (for the same resource record type 26c using the same registry data 23) that are not contained in the DNS data 34, i.e. as the signing key(s) SK1, Sk2 are different for the two different DNS data 34,34a versions It is recognized that the DNS publication service 22 is responsible for creating/maintaining the DNS data 34 (or DNS data 34a if the live version) resident on the DNS servers 32, such that the live DNS data 34 requires consistent updating/changing depending upon registry object 23 changes (e.g. updates/creations/deletions/modifications) affecting data pertinent to (or otherwise affecting) the DNS resource records 26 (of the live DNS data 34) as performed by the registry operator 20 during operation/maintenance of the domain names 14 of the registry database 18. It is recognized that the registry database 18 contains registry objects 23 (otherwise referred to as registry data 23—including contact objects 23, host objects 23, and other domain objects 23—e.g. such as registrant name, domain renewal date, domain creation date) amongst other registry data 23 pertinent to the creation and maintaining of the respective domain name(s) 14, including data relevant to resource records 26 used to populate the DNS data 34,34a (as generated by the DNS publication service 22). It is changes to these registry data 23 (e.g. due to EPP transactions 115 performed on the registry data 23 in the registry database 18) that necessitates changes (e.g. updates and/or newly created DNS records 26) to the DNS data 34,34a.

As such, the registrant 12 and/or the registrar 16 (or for that matter the DNS publication service 22 and/or the registry operator 20) can decide to implement a different version (e.g. as identified by a uniquely assigned DNS version serial number, such that DNS data 34 would have a different serial number from the serial number of DNS data 34a) of the DNS record(s) 26. In this manner, one or more versions of the DNS data 34,34a can be generated at the same time by the DNS publication service 22, using the different sets of generation instructions 105,105a. For example, the first version DNS data 34 can be generated and sent to the DNS 30 while the second version DNS data 34a can be generated and sent to the publication storage 19, recognizing that the publication storage is not the registry database 18. Alternatively, the first version DNS data 34a can be generated and sent to the DNS 30 while the second version DNS data 34 can be generated and sent to the publication storage 19, recognizing that the publication storage is not the registry database 18.

An advantage of utilizing the DNS publication service 22 to decidedly (via the signing identifier 110,110a) generate either first signed or second signed DNS data versions (34,34a) or both (i.e. DNS data 34 and DNS data 34a for example) is where a plurality of different registries 18 utilize the same DNS publication service 22, such that some of the domain names 14 can be operated as first signed domain(s) versions and some can be operated as second signed domain(s) versions. This distinction between considered first signed and second signed domain versions can be appreciated by the same registry 18, who may have some domain names 14 operating as first signed domains and some domain names 14 operating as second signed domains (e.g. employing different sets of registry data 23 resident in one or more registry databases 18). In either case, the same DNS publication service 22, and associated infrastructure of DNS servers 32 (associated with the respective DNS publication service 22), can be utilized by a plurality of registries 18 for signed domains. As such, the DNS publication service 22 can be flexibly operated, in parallel, for both for DNS operation of the first signed domain as well as simultaneously for the second signed DNS operation of the second signed domain, such that the first signed domain is for a zone of the domain name 14 that is different from the second signed zone (e.g. X.info and Y.info). In terms of the signed domains, the DNS data 34,34a generated by the DNS publication system 22 will contain at least a portion, if not all, signed DNS records 26. As such, in registries 18, it is recognized that there can be multiple different zones, any of which can have a specified version of DNSSEC operation, as specified by the generating instructions 105, 105*a* and other instructions as discussed.

A further advantage of the DNS publication system 22 is that for the same domain name 14, the registry 18 can consider to operate the DNS data 34 as the live version of the DNS data 34 and then at the same time validate or otherwise generate the next version DNS data 34*a* (as iteratively performed using at least one intermediate version 34*a'*, 34*a''*, 34*a'''*, 34*a''''*, 34*a'''''*), e.g. by comparing and/or validating the DNS data 34*a* against the DNS data 34 (e.g. DNS data 34*a'* against DNS data 34, DNS data 34*a''* against DNS data 34*a'*, etc.) generated in tandem via the testing facilities 21. As discussed, the need to iteratively test the DNS data 34*a* against the current version DNS data 34 (e.g. also referred to as a baseline DNS data 34) is required in view of the ever changing content of the current version DNS data 34 (e.g. due to the plurality of EPP transactions effected against the registry data 23 during operation of the domain name 14), recognizing that evolution of the registry data 23 of the domain name 14 (during its operation by the registry operator 20) could be expected to modify registry data 23 pertinent to the DNS resource records 26 (e.g. selected registry data) necessitating a change or update to the DNS data 34 utilized by the DNS 30. It is also recognized that one example of modified registry data 23 requiring a change in the DNS data 34 would be the registration of a new domain name 14 (e.g. a new domain name 14 create) or transfer of an existing domain name 14 to a new registrant 12 (e.g. a domain name 14 ownership transfer) requested by the registrant 12 (e.g. via the registrar 16). In this manner, the DNS records 26 related to registrant 12 ownership (e.g. domain name server records) could be affected by the registry data 23 creations/modifications in the registry database 18. As such, it is recognized that each transaction (e.g. EPP transaction) performed by the registry operator 20 on registry data 23 contained in the registry database 18, for those registry data affecting DNS records 26—e.g. registry data 23 that is used to populate DNS records 26, would trigger or otherwise instigate the record selection module 200 (see FIG. 3) obtaining the registry data 23 (pertaining to the DNS records 26 of the DNS data 34,34*a*) and thus facilitating the generation of the DNS data 34,34*a* as discussed.

Further, in view of the iterative performance using at least one intermediate version 34*a'*, 34*a''*, 34*a'''*, 34*a''''*, 34*a'''''*, the comparison of one intermediate portion would be done against another intermediate version. For example, for the second generated intermediate version DNS data 34*a''*, this would be compared against the concurrently operating first intermediate version DNS data 34*a'* (as published to the DNS 30 and thus in live operation). As discussed, the need to iteratively test the DNS data 34*a''* against the live next version DNS data 34*a'* (e.g. also referred to as a respective baseline DNS data 34*a'*—e.g. the previous intermediate version DNS data 34*a'*,a'',a''',a''''—for example DNS data 34*a'* is compared to DNS data 34, DNS data 34*a''* is compared to DNS data 34*a'*, DNS data 34*a'''* is compared to DNS data 34*a''*, DNS data 34*a''''* is compared to DNS data 34*a'''* and DNS data 34*a'''''* is compared to DNS data 34*a''''*) is required in view of the ever changing content of the current version DNS data 34 (e.g. due to the plurality of EPP transactions 115 effected against the registry data 23 during operation of the domain name 14), recognizing that evolution of the registry data 23 of the domain name 14 (during its operation by the registry operator 20) could be expected to modify registry data 23 pertinent to the DNS resource records 26 (e.g. selected registry data) necessitating a change or update to the DNS data 34 utilized by the DNS 30.

It is also recognized that one example of modified registry data 23 requiring a change in the DNS data 34 would be the registration of a new domain name 14 (e.g. a new domain name 14 create) or transfer of an existing domain name 14 to a new registrant 12 (e.g. a domain name 14 ownership transfer) requested by the registrant 12 (e.g. via the registrar 16). In this manner, the DNS records 26 related to registrant 12 ownership (e.g. domain name server records) could be affected by the registry data 23 creations/modifications in the registry database 18. As such, it is recognized that each transaction (e.g. EPP transaction) performed by the registry operator 20 on registry data 23 contained in the registry database 18, for those registry data affecting DNS records 26—e.g. registry data 23 that is used to populate DNS records 26, would trigger or otherwise instigate the record selection module 200 (see FIG. 3) obtaining the registry data 23 (pertaining to the DNS records 26 of the DNS data 34,34*a*) and thus facilitating the generation of the DNS data 34,34*a* as discussed.

Testing of the next DNS data 34*a* in the production facilities/servers 21 can be conducted as a comparative test by examining the number of changes we see in the zone data, by comparing the current DNS data 34 with the next DNS data 34*a* (e.g. DNS data 34*a'* with DNS data 34, DNS data 34*a''* with DNS data 34*a'*, etc.), (as iteratively performed using at least one intermediate version 34*a'*, 34*a''*, 34*a'''*, 34*a''''*, 34*a'''''*). For example, one could compare DNS data 34 content with DNS data 34*a* content in order to confirm that the registry side (e.g. registry data) changed 10 records (i.e. DNS data 34*a* is expected to have 10 different records over that of DNS data 34), so the results of the comparative test between the DNS data 34 and the DNS data 34*a* (as iteratively performed using at least one intermediate version 34*a'*, 34*a''*, 34*a'''*, 34*a''''*, 34*a'''''* by comparing the previous intermediate version published with the next intermediate version being tested) would only see/confirm 10 changes plus or minus and signature changes. In other words, if the results of the comparative test were to see 400 changes in this example, then the testing of the next DNS data 34*a* would fail, as the expected number of changes between the DNS data 34,34*a* was not confirmed. If the DNS data 34*a* (as iteratively performed using at least one intermediate version 34*a'*, 34*a''*, 34*a'''*, 34*a''''*, 34*a'''''*) as a result of the testing (e.g. confirmation of registry data changes) is deemed invalid, then the next DNS data 34*a* (as iteratively performed using at least one intermediate version 34*a'*, 34*a''*, 34*a'''*, 34*a''''*, 34*a'''''*) would be discarded and not become the update DNS data 34*b*. In this case, the next DNS data 34*a* (e.g. one of the at least one intermediate version 34*a'*, 34*a''*, 34*a'''*, 34*a''''*, 34*a'''''*) would be removed from the production facilities/servers 21 in a network path 11*d* that bypasses both the registry database 18 and the DNS 30. For example, the network path 11*d* could simply be a deletion of the failed next DNS data 34*a* (e.g. one of the at least one intermediate version 34*a'*, 34*a''*, 34*a'''*, 34*a''''*, 34*a'''''*) from the publication database 19. Alternatively, the network path 11*d* could simply be a storing of the failed next DNS data 34*a* in a failed testing database 19*a* (see FIG. 3).

As an alternative embodiment, for a semantic test of the zone itself (utilizing validating resolvers for example), the production facilities/servers 21 would examine the next DNS data 34*a* to look/check the signatures of next DNs data 34*a* (as iteratively performed using at least one version 34*a'*, 34*a''*, 34*a'''*, 34*a''''*, 34*a'''''*) are indeed valid for the zone. For example, validating resolvers of the production facilities/ servers 21 would work with simulated queries (working the chain of trust from the client side) and check the signatures in terms of working a simulated DNS environment and using their key set). If the DNS data 34*a* (as iteratively performed using at least one intermediate version 34*a*', 34*a*", 34*a*''', 34*a*'''', 34*a*''''') as a result of the validation (e.g. signatures testing) is deemed valid, then the final next DNS data 34*a* would become the update DNS data 34*b*. It is also recognized that if the currently tested intermediate version DNS data 34*a*', a", a''', a'''', a''''' passes, then it is used to replace the previously published intermediate version DNS data 34, 34*a*',a",a''',a''''. If the DNS data 34*a* (as iteratively performed using at least one intermediate version 34*a*', 34*a*", 34*a*''', 34*a*'''', 34*a*''''') as a result of the validation (e.g. signatures testing) is deemed invalid, then the next DNS data 34*a* (as iteratively performed using at least one intermediate version 34*a*', 34*a*", 34*a*''', 34*a*'''', 34*a*''''') would be discarded and not become the update DNS data 34*b*. In this case, the next DNS data 34*a* (as iteratively performed using at least one intermediate version 34*a*', 34*a*", 34*a*''', 34*a*'''', 34*a*''''') would be removed from the production facilities/servers 21 in a network path 11*d* that bypasses both the registry database 18 and the DNS 30. For example, the network path 11*d* could simply be a deletion of the failed next DNS data 34*a* (as iteratively performed using at least one intermediate version 34*a*', 34*a*", 34*a*''', 34*a*'''', 34*a*''''') from the publication database 19. Alternatively, the network path 11*d* could simply be a storing of the failed next DNS data 34*a* (as iteratively performed using at least one intermediate version 34*a*', 34*a*", 34*a*''', 34*a*'''', 34*a*''''') in a failed testing database 19*a* (see FIG. 3).

For example, the DNS publication service 22 could have an identifier table 38 (stored in a publication database 19 as including the generation instructions 105, 105*a*), providing the signing identifier 110,110*a* (e.g. indicating to use the SK1 or the SK2) as well as the publication identifier 39 (e.g. for publication or publication restriction for a particular DNS data set 34,34*a*-(as iteratively performed using at least one intermediate version 34*a*', 34*a*", 34*a*''', 34*a*'''', 34*a*''''') associated with the domain name 14. Further, it is recognized that the DNS publication service 22 is responsible for receiving the registry data 23 (e.g. selected data pertinent to the DNS records 26) of the domain name 14 (e.g. as obtained from the domain name registry 18 database) and then using the obtained registry data 23 to generate the DNS data 34,34*a*. The live version DNS data 34,34*a* can then be transmitted directly to the DNS 30 (i.e. published to the DNS servers 32) in the network transmission path 11*a* that bypasses the domain name registry 18 database (as iteratively performed using at least one intermediate version 34*a*', 34*a*", 34*a*''', 34*a*'''', 34*a*'''''). In other words, the generated live version DNS data 34,34*a* is not returned/stored to/in the domain name registry 18 database once generated, rather the generated live version DNS data 34,34*a* is sent by the DNS publication service 22 directly over the network path 11*a* to the plurality of DNS servers 32 associated with the domain name 14 (e.g. as administered by the DNS publication service 22). Therefore, it is recognized that each time that new/modified live version DNS data 34,34*a* is to be generated (as iteratively performed using at least one intermediate version 34*a*', 34*a*", 34*a*''', 34*a*'''', 34*a*'''''), the associated registry data 23 (e.g. RD1, RD2, etc.) is obtained by the DNS publication service 22 for use in generating and then transmitting of the resultant live version DNS data 34,34*a* over the transmission path 11*a* (as iteratively performed using at least one intermediate version 34*a*', 34*a*", 34*a*''', 34*a*'''', 34*a*'''''). Further, the next version DNS data set 34,34*a* designated as "publication restriction" is stored in the publication storage 19 (i.e. not in the domain name registry 18 database) for subsequent operational testing (e.g. not accessible by the users 12 over the network 11) of the domain using the stored, e.g. next version, DNS data set 34,34*a*. Meanwhile, the transmitted live version DNS data set 34,34*a* designated as "publication" is used by the DNS servers 32 in order to operate the domain (of the domain name 14) for network 11 access by the users 12 (e.g. to gain access to the network resources 31 using the DNS services provided by the DNS servers 32 of the DNS 30).

In this manner, the registry 18 can continue to operate live their zone for the domain name 14 using the live version (e.g. first) DNS data 34 (via the DNS servers 32) while simultaneous testing is performed on their domain name 14 using the next version (e.g. second) DNS data 34*a* (via production facilities/servers 21 requesting and obtaining the next version DNS data 34*a*) in interacting with the stored DNS data 34*a* of the publication storage 19. For example, the production facilities 21 can use the stored next version DNS data 34*a* (as iteratively performed using at least one intermediate version 34*a*', 34*a*", 34*a*''', 34*a*'''', 34*a*''''') to replicate selected DNS operations implemented (as shared with the production facilities 21 by the DNS 30 and/or the registry operator 20 by example) with respect to the live domain name registry 18 database and/or the live DNS 30. It is also recognized that the production facilities/servers 21 have available access to both the live version DNS data 34 and the next version DNS data 34*a* (as iteratively performed using at least one intermediate version 34*a*', 34*a*", 34*a*''', 34*a*'''', 34*a*'''''), such that the next version DNS data 34*a* can be compared (as iteratively performed using at least one intermediate version 34*a*', 34*a*", 34*a*''', 34*a*'''', 34*a*''''') and/or otherwise validated with respect to the live (or otherwise previously published intermediate version next version) version DNS data 34.

Accordingly, as noted herein, the generated resource records 26 and resultant DNS data 34 are not stored in the registry database 18, rather the DNS data 34 (containing the signed/unsigned resource records 26 for use in implementing the operation of the DNS 30) is published directly to the DNS 30 using the transmission path 11*a*, while the next version DNS data 34*a* is stored directly in the publication storage 19 in a transmission path 11*b* that also preferably bypasses the registry database 18. In other words, preferably, the publication database 19 is separate from the registry database 18, such that that the publication storage 19 (containing the next version DNS data 34*a*) is not accessible by the resolver servers 35 and/or the DNS servers 32. Further, it is recognized that the DNS servers 32 of the DNS 30 do not have access (are inhibited) to the stored next version DNS data 34*a*, such that the next version DNS data 34*a* (as iteratively performed using at least one intermediate version 34*a*', 34*a*", 34*a*''', 34*a*'''', 34*a*''''') is not used to implement access to the network resources 31 by the DNS 30 (working in tandem with the resolver servers 35 operating in conjunction with the computing network devices of the users 12,13.

The registry data 23 (pertinent to the resource records 26) can be obtained synchronously or asynchronously (as a DNS request 23*a*) from a registry data source (e.g. a registry data client—i.e. a client of the server implementing the DNS publication service 22). The registry data client (of the DNS publication service 22) can be provided as the registrar 16, the registry operator 20, and/or the registry database 18 itself (e.g. via a registry server 18*a* managing transfer of registry data 23 into/out of the registry database 18 itself). It is important to note that the registry data client (e.g. network entity 16, 18, 20) only provides/sends the registry data 23 to the DNS publication service 22. Importantly, the registry data client (from which the registry data 23 was obtained) does not receive the resultant live version DNS data 34 intended for receipt by the DNS 30 (as generated by the DNS publication service 22). Rather, preferably, the generated DNS data 34 (intended for use by the DNS 30) is published to the DNS 30 in the network transmission path 11a that bypasses the registry data client. In other words, the generated DNS data 34 (as a response to the receipt of the registry data 23 in the form of a synchronous or asynchronous DNS request 23a from the registry data client) is not returned to the registry data client. As discussed, in general, any live version DNS data 34 transmitted/published to the DNS 30 is intended to facilitate interaction between the resolver servers 35 and the DNS servers 32. On the contrary, as discussed, in general, any next version DNS data 34a transmitted to the publication storage 19 is not intended (i.e. inhibited) to facilitate any live interaction between the resolver servers 35 and the DNS servers 32.

It is recognized that an appropriate response to the received DNS request 23a (e.g. a response from the DNS publication service 22 to the registry data client) can be, for example; an acknowledgement of receipt the DNS request 23a, a confirmation of generation/publication of the DNS data 34, a null response, or any other form of response other than transmission of the generated DNS data 34 for purposes of storing in the registry database 18. In other words, the registry data client does not expect to receive the generated live DNS data 34 intended for publication in the DNS 30, in response to the provision of the registry data 23 in the form of the DNS request 23a. It is recognized that the DNS request 23a can be a result of one or more changes (e.g. create/modify/delete) in the registry data 23 that is pertinent to the data contained in the resource records 26 of the DNS 30 (as implemented by the DNS servers 32). These changes in the registry data 23 can be the result of the EPP transaction(s) received (and processed) by the registry operator 20 from a respective registrant 12 and/or registrar 16 for one or more domain name(s) 14 associated with the registry data 23. Another cause for receipt of the DNS request 23a by the DNS publication service 22 could be TTL requirements of the DNS data 34 (e.g. due to upcoming expiration of the DNS data 34 held in the DNS 30). In any event, the generated DNS data 34 for use in the DNS 30 is not stored in the registry database 18.

Domain Names 14

In general, the domain names 14 can be setup or otherwise maintained/renewed for a domain name registrant 12 (e.g. domain owner) via a domain name registrar 16 for one or more domain names 14 available (e.g. not yet claimed) or otherwise owned in a domain name registry 18 (e.g. a database of all domain names registered in a top-level domain (TLD)). The domain name registry 18 can be managed by a registry operator 20 (or the registry services provider 22) that also generates zones (e.g. represented by the relevant zone data) which represent a lookup of the domain names 14 to IP addresses, for example as performed by the DNS servers 32 using the DNS data 34 published by the publication system 10. As further described below, the DNS data 34 are based on resource records 26 (e.g. Name Server name/address records, Delegation Signer records, etc.) associated with the registry data 23 of particular domain name(s) 14. It is recognized that DNSSEC related resource records 26 are not stored in the registry database 18, as these are generated on the fly by the DNS publication system 22 using the generation instructions 105,105a (see FIG. 3) associated with the domain names 14. It is also recognized that the DNS data 34 can include other data specific to the DNS zone itself (e.g. the zone apex).

A zone data, e.g. the DNS data 34 of a domain name 14, is representative of a text file that describes a portion of the DNS called a DNS zone, including the owner of the record. A zone data (e.g. the DNS data 34) is organized in the form of resource records (RR) 26 and contains information that defines mappings between domain names 14 and IP addresses and other resources 31, as based upon registry data 23. For example, the DNS data 34 contains the DNS records 26 in wire transfer format, as implemented in the DNS 30. The format of zone data can be defined by a standard, with each line typically defining a single resource record 26. A line begins with a domain name, but if left blank, can default to the previously defined domain name. Following the domain name can be the time to live (TTL), the class (which is almost always "IN" for "internet" and rarely included), the type 26c of resource record (A, MX, SOA, etc.), followed by type-specific data such as the IPv4 address for A records. Comments can be included by using a semi-colon and lines can be continued by using parentheses. There are also directives that are marked with a keyword starting with a dollar sign.

Within the DNS publication system 10, the registry operator 20 can interact with the registry service provider 22 (aka DNS publication service 22)), in order to facilitate registrants 12 responsible for generating and maintaining web pages 31 (e.g. network resources 31 that can be hosted by the registrants 12) associated with domain name 14. It is recognized that registrant 12 itself can communicate directly with registry service provider 22 for providing the registry data 23 used in generation of the DNS data 34, and/or can have the registry data 23 communicated to the registry service provider 22 (e.g. DNS publication service 22) via the registry operator 20 and/or the registrar 16. As such, once the DNS data 34 is published on the DNS 30, network 11 users can access network resources 31 via the network 11 and accordingly access content/services provided by the network resources 31 (e.g. web pages, web services, email services, etc.). An example of such access is the network 11 users 13 using a web browser to navigate on the network 11 to web pages 31 and displaying of web content 31 on a user interface of the user's 13 computer device 100 (see FIG. 5). It is recognized that the network 11 address (i.e. IP address) of the various network resources 31 are obtained by the users 13 via the DNS data 34 implemented by the DNS servers 32, as further described below.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that domain name registrar 16, registry operator 20 and DNS publication service 22 can be implemented on the computer devices 100 (see FIG. 5) such as servers and can communicate with one another via the network 11 in client-server relationships.

In general, a domain name 14 is an identification string that defines a realm of administrative autonomy, authority, or control on the Internet 11, whereby domain names 14 are formed by the rules and procedures of the DNS 30. Domain names 14 are used in various networking contexts and application-specific naming and addressing purposes, as an Internet Protocol (IP) resource 31, such as a personal computer used to access the Internet 11, a server computer 33 hosting a web site 31, or the web site 31 itself or any other service 21 communicated via the Internet 11. Domain names 14 are organized in subordinate levels (subdomains) of the DNS root domain, which is referred to as the root zone, and is represented as a single dot ("."). The first-level set of domain names 14 are the TLDs. Below these TLDs in the DNS 30 hierarchy are the second-level and third-level domain names 14 that are typically open for reservation by end-users who wish to connect local area networks to the Internet 11, create other publicly accessible Internet resources 31 or run web sites 31. There can be fourth- and fifth-level domains, and so on, with virtually no limitation. The registration of these domain names 14 is usually administered by domain name registrars 16 who sell their services to the public (i.e. registrants 12). Individual Internet host computers can use domain names 14 as host identifiers, or hostnames. Hostnames can be defined as the leaf labels in the domain name system usually without further subordinate domain name space and can appear as a component in Uniform Resource Locators (URLs) for Internet resources 31 such as web sites 31 having one or more web pages 31. Domain names 14 can also be used as simple identification labels to indicate ownership or control of a resource 31, such as realm identifiers used in the Session Initiation Protocol (SIP), DomainKeys used to verify DNS domains in email systems 31, and in many other Uniform Resource Identifiers (URIs). For example, the domain name 14 can be a component of a (URL) used to access web sites 31, for example: URL—http://www.example.info/index.html, Top-level domain name: info, Second-level domain name: example.info, Host name: www.example.info.

Domain name 14 can consist of one or more parts, technically called labels, which are conventionally concatenated, and delimited by dots, such as example.info. Not that the rightmost dot, representing the root zone, is many times omitted in the vernacular—it should be implied if not specified (e.g. for the domain name expressed as "example.info", the Fully Qualified Domain Name would be "example.info."). The right-most label conveys the TLD, for example, the domain name www.example.info falls under the TLD .info. The hierarchy of domains descends from the right to the left label (or from left to right depending upon language considerations) in the name; each label to the left specifies a subdivision, or subdomain of the domain to the right. For example: the label example specifies a node example.info as a subdomain of the info domain, and www is a label to create www.example.info, (e.g. a subdomain or otherwise an element of the domain) of example.info. A hostname is a domain name 14 that has at least one associated IP address. For example, the domain names www.example.info and example.info may also be hostnames, whereas the info domain is not. However, other TLDs, particularly country code top-level domains, may indeed have an IP address, and if so, they are also hostnames. It is recognized that hostnames can impose restrictions on the characters allowed in the corresponding domain name 14. A valid hostname is also a valid domain name 14, but a valid domain name 14 may not necessarily be valid as a hostname.

Referring again to FIG. 1, the domain name registry 18 can contain those domain names 14 that are registered for a specific TLD, which is one of the domains immediately under the highest level in the hierarchical Domain Name System (DNS) 30 of the Internet 11. Practically speaking, TLD names 14 are installed in the root zone of the name space for the TLD and for all domains in lower levels, the TLD is the last part of the domain name 14, that is, the last label of a fully qualified domain name, with the trailing dot for the root zone designation. It is recognized that there can be a number of different TLD types, such as but not limited to: country-code top-level domains (ccTLD) consisting of two letter domains established for countries or territories; internationalized country code top-level domains (IDN ccTLD) which are ccTLDs in non-latin character sets (e.g., Arabic or Chinese) which are displayed in end-user applications in their language-native script or alphabet but use a Punycode-translated ASCII domain name in the Domain Name System 30; generic top-level domains (gTLD) which are top-level domains with three or more characters (e.g. GOV, EDU, COM, MIL, INFO, NET and INFO) including unsponsored top-level domains which are domains that operate directly under policies established for the global Internet community and sponsored top-level domains (sTLD) that are proposed and sponsored by private agencies or organizations that establish and enforce rules restricting the eligibility to use the TLD; and infrastructure top-level domain that is one domain, the Address and Routing Parameter Area (ARPA) managed on behalf of the Internet Engineering Task Force for various purposes specified in the Request for Comments publications.

Domain names 14 can be formed from the set of alphanumeric ASCII characters (a-z, A-Z, 0-9), but characters are case-insensitive. In addition, the hyphen can be permitted if it is surrounded by a characters or digits, i.e. it is not the start or end of a label. Labels are separated by the full stop (period) character in the textual name representation, and are limited to 63 characters in length. It is recognized that the domain names 14 can be represented using characters based in other languages as well, including alternate formats as appropriate, as desired.

Referring to FIG. 1, shown are network resources 31, which are accessible via a specified URI (over the network 11) of the server 33 incorporating the domain name 14 associated with the specified TLD maintained in domain name registry 18, using an appropriate network communications protocol (e.g. SMTP, HTTP, HTTPS, etc.). For example, the network communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the Internet) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

DNS Publication Service 22

Referring to FIGS. 3 and 8, shown is a block diagram of the DNS publication system 22. The DNS publication system 22 has a plurality of components 200, 202, 204, e.g. configured as logical/software and/or hardware components for acting alone or in combination, for obtaining/receiving the registry data 23 from the registry database 18, for generating the live version DNS data 34 according to a set of generation instructions 105 and for transmitting the generated DNS data 34 to the DNS servers 32 of the DNS

30. Also, the DNS publication system 22 has a plurality of components 200, 202, 204, e.g. configured as logical/software and/or hardware components for acting alone or in combination, for obtaining/receiving the registry data 23 from the registry database 18, for generating the next version DNS data 34*a* according to a set of generation instructions 105*a* and for transmitting the generated DNS data 34*a* to the publication storage 19, as accessible by the testing facilities 21. For example, the components 200, 202, 204 could each be implemented as a set of instructions stored in a storage and executing on a computer processor (e.g. a server) in order to perform their respective functions (e.g. processing) on the registry data 23 and/or the DNS records 26. Alternatively, the components 200, 202, 204 could each be implemented as a hardware (e.g. a solid state device) having storage and one or more computer processors in order to perform their respective functions (e.g. processing) on the registry data 23 and/or the DNS records 26. Alternatively, the components 200, 202, 204 could each be implemented as a combination of a set of instructions stored in a storage and executing on a computer processor and a hardware (e.g. a solid state device) having storage and one or more computer processors in order to perform their respective functions (e.g. processing) on the registry data 23 and/or the DNS records 26.

Examples of the components could be a record selection module 200, a distribution system 202 and a signing system 204 (e.g. one or more signing systems in the case where the signature module 204*b* and the record generation module 204*a* can utilize the first signing key(s) SK1 and the signature module 205*b* and the record generation module 205*a* can utilize the second signing key(s) SK2, further described below. It is also recognized that each signing module 204*b*, 205*b* could contain both key groups SK1, SK2. It is recognized that the generation instructions 105,105*a* can include instructions (hosted/shared by one or more of the components 200, 202, 204) pertaining to the manner in which DNSSEC (and also include related DNSSEC records 106, 106*a* stored in a DNSSEC storage 19*a*) is implemented or not with respect 107 to particular one or more domain name(s) 14 (e.g. domains, subdomains, etc. as part of a defined zone) having the resource records 26 (see FIGS. 3,8). In one embodiment, the generation instructions 105, 105*a*, the DNSSEC records 106, 106*a*, and signing identifiers 110, 110*a*, and publication identifiers 39, 39*a* can be stored in the table 38, such that each of the domain names 14 are assigned respective generation instructions 105, 105*a*, DNSSEC records 106, 106*a* and/or signing identifiers 110, 110*a* and/or publication identifiers 39, 39*a* in the table 38. As such, the DNS publication service 22 consults (or is otherwise configured) by the generation instructions 105, 105*a*, DNSSEC records 106, 106*a* and/or signing identifiers 110, 110*a* and/or publication identifiers 39, 39*a* when the DNS data 34,34*a* is generated for the respective domain name(s) 14. As discussed, it is recognized that for the same zone of the domain name 14 (i.e. the same set of registry data 23), the current version DNS data 34 is generated using the first signing key(s) SK1 and the next version DNS data 34*a* is iteratively generated using the first and second signing key(s) SK1, SK2, as dictated by the selected type of rollover process (e.g. ZSK rollover, KSK rollover or algorithmic rollover). Once the key/algorithmic rollover is complete, then the final update data DNS 34*b* is signed only using the second signing key(s) SK2.

Referring to FIG. 9*a*, shown is an example of a ZSK rollover, namely replacing a ZSKa (first signing key SK1 of the SK1 group) with a next ZSKb (second signing key SK2 of the SK2 group), such that ZSKa is different from ZSKb. At step 800, the DNS 30 is populated with the DNS data 34 (i.e. containing DNSKEYS ZSKa, KSK used for generating signatures as the RRSIG record(s) 26*a* for the various record types 26*c* (see FIG. 2). At first stage 904*a*, the next ZSKb is generated (e.g. by the signing module). Further at the first stage 904*a*, separated by a second stage 904*b* by a hold down period 902, the DNS publication system 22 generates, tests (via the testing facilities 21) and then publishes the first iteration DNS data 34*a*', which contains one or more RRSIG record(s) 26*a* using the KSK to sign both the ZSKa and the ZSKb.

Once the DNS data 34*a*' is published to the DNS 30 via the network path 11*a*, the hold down period 902 (e.g. a multi-day period influenced by TTL parameters) is implemented such that the first iteration DNS data 34*a*' can be recognised during the hold down period 902 by all of the resolver servers 35 (i.e. the caches in the resolver servers 35 have expired and thus have the opportunity to be repopulated with the first iteration DNS data 34*a*') cooperating with the DNS servers 32 in the DNS 30. It is recognized that the caches of the resolver servers 35 expire and then come to contain the first iteration DNS data 34*a*', either during or after the hold down period 902.

For example, while the hold down period 902 is being implemented, as a resultant of stage 904*b*, the DNS publication system 22 generates, tests and then publishes (once testing/validation is confirmed) a second iteration DNS data 34*a*'' (also referred to as the update DNS data 34*b* in this case). In this case, the second iteration DNS data 34*a*'' is the final version of the DNS data 34*a*, thus referred to ultimately as the update DNS data 34*b*. The contents of the second iteration DNS data 34*a*'' would have signed record types 26*c* using the SK2, i.e. the KSK and ZSKb keys, such as mail record types MX, etc. Once the update DNS data 34*b* is published to the DNS 30, the testing/validation is considered completed for the next version DNS data 34*a* and the key rollover process (changing from SK1 to SK2) is complete. It is also recognized that after publication of the second iteration DNS data 34*a*'' in stage 904*b*, the system could start the repeat 906 the first stage 904*a*, however now utilizing the next ZSKc value (i.e. the next ZSKc generated by the signing module containing an RRSIG record 26*a* using the KSK to sign both the ZSKb and the ZSKc) as the next iteration of stage 904*a*. In this manner, a regular set of stages 904*a*, 904*b*, 904*a*, 904*b* etc. could be implemented by the DNS publication system 22, each separated by a hold down period 902 (i.e. 904*a* followed by 902 followed by 904*b* followed by 904*a* followed by 902, etc.), as the signing keys ZSKa,b,c are rolled over repeatedly. It is recognized that step 906 could contain a hold down period 902 as well, depending upon the amount of time between stage 904*b* and the repeat of stage 902*a*.

In other words, in general, each time an RRSIG record 26*a* is generated using the KSK for both the current and next ZSK, here is a hold down period 902 before the RRSIG records 26*a* are then generated and published for all applicable record types 26*c* utilizing the KSK and the next ZSK only (such that the current ZSKa is replaced by the next ZSKb, current ZSKb with the next ZSKc, etc.). In this manner, as by example in FIG. 9*a*, the ZSK rollover procedure can use two stages (for a particular next ZSKb, ZSKc, etc.) interrupted by a hold down period 902. However for a particular new ZSK, discrete stages 904*a* (for generation of the RRSIG record 26*a* for both the current ZSKa and next ZSKb using the KSK) and the use of the KSK and next ZSKb to generate all RRSIG records 26a for the applicable record types 26a (as per the generation instructions 105a).

Referring to FIG. 9b, a rollover procedure for a KSK is provided by example, in effect changing from a current KSKa (first signing key SK1 of the first key group SK1) to a next KSKb, (second signing key SK2 of the second signing key group SK2), such that KSKa is different from KSKb. At step 810, the DNS 30 is populated with the current DNS data 34, i.e. containing DNSKEYS ZSK, KSKa used for generating signatures for the RRSIG record(s) 26a for the various record types 26c (see FIG. 2). At the first stage 914a, the next KSKb is generated (e.g. by the signing module 204, 205). Further, at the first stage 914a (separated by a second stage 914b by a hold down period 902a, which is followed by a third stage 914c separated by a second hold down period 902b), the DNS publication system 22 generates, tests (via the testing facilities 21) and then publishes the first iteration DNS data 34a', which contains a first RRSIG record 26a using the KSKa to sign the ZSK and the KSKa, KSKb and a second RRSIG record 26a using the KSKb to sign the ZSK and the KSKa, KSKb.

Once the first iteration DNS data 34a' is published to the DNS 30 via the network path 11a, the first hold down period 902a (e.g. a multi-day period influenced by TTL parameters) is implemented such that the first iteration DNS data 34a' can be recognised during the hold down period 902a by all of the resolver servers 35 (i.e. the caches in the resolver servers 35 have expired and thus have the opportunity to be repopulated with the first iteration DNS data 34a') cooperating with the DNS servers 32 in the DNS 30. It is recognized that the caches of the resolver servers 35 expire and then come to contain the first iteration DNS data 34a', either during or after the hold down period 902.

While the first hold down period 902a is being implemented, as a resultant of stage 914b, the DNS publication system 22 generates, tests and then can publish (once testing/validation is confirmed and after the first hold down period 902a is complete) a second iteration DNS data 34a" which now contains new Delegation Signer records 26c (containing reference to the next KSKb) and also removes the current Delegation Signer records 26c (containing reference to the KSKa). It is recognized that the changes to the DS records 26c can be included in the second iteration DNS data 34a" or can be instead sent to the parent zone for implementation by the operator of the parent zone. In other words, the new DS records 26c can be optionally included in the second iteration DNS data 34a" or not, depending upon whether the parent zone is operated by the DNS publication service 22 or not.

The second hold down period 902b is then implemented (e.g. a multi-day period influenced by TTL parameters), such that the second iteration DNS data 34a" can be recognised during the hold down period 902b by all of the resolver servers 35 (i.e. the caches in the resolver servers 35 have expired and thus have the opportunity to be repopulated with the second iteration DNS data 34a") cooperating with the DNS servers 32 in the DNS 30. It is recognized that the caches of the resolver servers 35 expire and then come to contain the second iteration DNS data 34a", either during or after the hold down period 902.

It is recognized that the DS records are replaced in the parent zone (i.e. the zone above the current zone), which may (or may not) be performed by the DNS publication system 22 itself. In other words, the DNS publication system 22 could use the signing module(s) 205 to generate the new DS records (containing the next KSKb), however the DNS publication system 22 would then send the new DS records to a third party for them to implement the switch between the DS records (containing KSKa) and the update DS records (containing KSKb). It is also recognized that for subzones (e.g. children zones of the parent zone), the DNS publication system 22 could implement the DS record switch, as desired.

Also during the second hold down period 902b, as a resultant of stage 914c, the DNS publication system 22 generates, tests and then publishes (once testing/validation is confirmed) a third iteration DNS data 34a''' which now has removed therefrom the KSKa, has removed therefrom the first RRSIG record 26a (signed using KSKa) and has removed therefrom the second RRSIG record 26a (signed using KSKb), while at the same time containing all RRSIG records 26a for all record types 26c now using only the KSKb. In this case, the third iteration DNS data 34a''' can be referred to as the update DNS data 34b. In this case, the third iteration DNS data 34a''' is the final version of the DNS data 34a, thus referred to ultimately as the update DNS data 34b. The contents of the third iteration DNS data 34a''' would have signed record types 26c using the SK2, i.e. the KSKb and ZSK keys, such as mail record types MX, etc. Once the update DNS data 34b is published to the DNS 30, the testing/validation is considered completed for the next version DNS data 34a and the key rollover process (changing from SK1 to SK2, i.e. from ZSKa to ZSKb) is complete.

It is also recognized that after publication of the third iteration DNS data 34a''' in stage 904b, the system could start the repeat 916 the first stage 914a, however now utilizing the next KSKc value (i.e. contains the first RRSIG record 26a using the KSKb to sign the ZSK and the KSKb, KSKc and a second RRSIG record 26a using the KSKc to sign the ZSK and the KSKb, KSKc) as the next iteration of stage 914a. In this manner, a regular set of stages 914a, 914b, 914c, 914a, 914b, 914c etc. could be implemented by the DNS publication system 22, each separated by a hold down period 902 (i.e. 914a followed by 902 followed by 914b followed by 902 followed by 914c, etc.), as the signing keys KSK a,b,c are rolled over repeatedly. It is recognized that step 916 could contain a hold down period 902 as well, depending upon the amount of time between stage 914c and the repeat of stage 914a.

Referring to FIG. 9c, shown is an example algorithmic rollover using the DNS publication system 22 (see FIG. 1), in other words changing from cryptographic algorithm A to cryptographic algorithm B, in effect changing from a current ZSKa, KSKa (first signing keys SK1 of the first key group SK1) to a next ZSKB, KSKb, (second signing keys SK2 of the second signing key group SK2), such that ZSKa, KSKa are different from ZSKb, KSKb. At step 815, the DNS 30 is populated with the DNS data 34, i.e. containing DNSKEYS ZSKa, KSKa (by using the cryptographic algorithm A) for generating signatures for the RRSIG record(s) 26a for the various record types 26c (see FIG. 2). At the first stage 924a, the next ZSKb, KSKb are generated (e.g. by the signing module 204,205 using the algorithm B), however the next KSKb is not published/utilized. Further, at the first stage 924a (separated by a second stage 924b by a hold down period 902a, which is followed by a third stage 924c separated by a second hold down period 902b, which is followed by a fourth stage 924d separated by a third hold down period 902c, which is followed by a fifth stage 924e separated by a fourth hold down period 902d), the DNS publication system 22 generates, tests (via the testing facilities 21) and then publishes the first iteration DNS data 34a', which contains the use of the ZSKa and ZSKb to sign the zones.

Once the first iteration DNS data 34a' is published to the DNS 30 via the network path 11a, the first hold down period 902a (e.g. as dictated by the TTL parameters of the DNS 30) is then implemented (e.g. a multi-day period influenced by TTL parameters), such that the first iteration DNS data 34a' can be recognised during the hold down period 902a by all of the resolver servers 35 (i.e. the caches in the resolver servers 35 have expired and thus have the opportunity to be repopulated with the first iteration DNS data 34a') cooperating with the DNS servers 32 in the DNS 30. It is recognized that the caches of the resolver servers 35 expire and then come to contain the first iteration DNS data 34a', either during or after the hold down period 902a.

While the first hold down period 902a is being implemented, as a resultant of the second stage 924b, the DNS publication system 22 generates, tests and then publishes (once testing/validation is confirmed and after the first hold down period 902a is complete) the second iteration DNS data 34a" which contains ZSKa, ZSKb, KSKa, KSKb and the first RRSIG record 26a using the KSKa to sign the ZSKa, ZSKb, KSKa, KSKb and a second RRSIG record 26a using the KSKb to sign the ZSKa, ZSKb, KSKa, KSKb.

The second hold down period 902b is then implemented (e.g. as dictated by the TTL parameters of the DNS 30), such that the second iteration DNS data 34a" can be recognised during the hold down period 902b by all of the resolver servers 35 (i.e. the caches in the resolver servers 35 have expired and thus have the opportunity to be repopulated with the second iteration DNS data 34a") cooperating with the DNS servers 32 in the DNS 30. It is recognized that the caches of the resolver servers 35 expire and then come to contain the second iteration DNS data 34a", either during or after the hold down period 902b.

While the second hold down period 902b is being implemented, as a resultant of third stage 924c, the DNS publication system 22 generates, tests and then publishes (once testing/validation is confirmed and after the second hold down period 902b is complete) a third iteration DNS data 34a''' which now contains new Delegation Signer records 26c (containing reference to the next KSKb) and also removes the current Delegation Signer records 26c (containing reference to the KSKa). It is recognized that the changes to the DS records 26c can be included in the third iteration DNS data 34a''' or can be instead sent to the parent zone for implementation by the operator of the parent zone. In other words, the new DS records 26c can be optionally included in the third iteration DNS data 34a''' or not, depending upon whether the parent zone is operated by the DNS publication service 22 or not.

It is recognized that the DS records are replaced in the parent zone (i.e. the zone above the current zone), which may (or may not) be performed by the DNS publication system 22 itself. In other words, the DNS publication system 22 could use the signing module(s) 205 to generate the new DS records (containing the next KSKb), however the DNS publication system 22 would then send the new DS records to a third party for them to implement the switch between the DS records (containing KSKa) and the update DS records (containing KSKb). It is also recognized that for subzones (e.g. children zones of the parent zone), the DNS publication system 22 could implement the DS record switch, as desired.

The third hold down period 902c is then implemented (e.g. as dictated by the TTL parameters of the DNS 30), such that the third iteration DNS data 34a''' can be recognised during the hold down period 902c by all of the resolver servers 35 (i.e. the caches in the resolver servers 35 have expired and thus have the opportunity to be repopulated with the third iteration DNS data 34a''') cooperating with the DNS servers 32 in the DNS 30. It is recognized that the caches of the resolver servers 35 expire and then come to contain the third iteration DNS data 34a''', either during or after the hold down period 902c.

While the third hold down period 902c is being implemented, as a resultant of fourth stage 924d, the DNS publication system 22 generates, tests and then publishes (once testing/validation is confirmed and after the third hold down period 902c is complete) a fourth iteration DNS data 34a'''' which now removes all presence of the current ZSKa, KSKa from the second key group SK2 and then uses KSKb to sign the second key group SK2 (now only containing ZSKb, KSKb). However, the fourth iteration DNS data 34a'''' does contain the use of KSKb to sign the DNS KEY RRset and the use of both ZSKa and ZSKb to sign the DNS record types 26c (e.g. MX records) of the zone.

The fourth hold down period 902d is then implemented, (e.g. as dictated by the TTL parameters of the DNS 30), such that the fourth iteration DNS data 34a'''' can be recognised during the hold down period 902d by all of the resolver servers 35 (i.e. the caches in the resolver servers 35 have expired and thus have the opportunity to be repopulated with the fourth iteration DNS data 34a'''') cooperating with the DNS servers 32 in the DNS 30. It is recognized that the caches of the resolver servers 35 expire and then come to contain the fourth iteration DNS data 34a'''', either during or after the hold down period 902d.

While the fourth hold down period 902d is being implemented, as a resultant of fifth stage 924e, the DNS publication system 22 generates, tests and then publishes (once testing/validation is confirmed and after the fourth hold down period 902d is complete) a fifth iteration DNS data 34a''''', which now only contains the use of ZSKb to sign the DNS record types 26c (e.g. MX records) of the zone, hence the fifth iteration DNS data 34a''''' does not contain any signatures using ZSKa. In this case, the fifth iteration DNS data 34a''''' can be referred to as the update DNS data 34b. In this case, the fifth iteration DNS data 34a''''' is the final version of the DNS data 34a, thus referred to ultimately as the update DNS data 34b. The contents of the fifth iteration DNS data 34a''''' would have signed record types 26c using the SK2, i.e. using the ZSKb key, such as mail record types MX, etc. The fifth iteration DNS data 34a''''' does contain the use of KSKb to sign the DNS KEY RRset and the use of both only ZSKb to sign the DNS record types 26c (e.g. MX records) of the zone. Once the update DNS data 34b is published to the DNS 30, the testing/validation is considered completed for the next version DNS data 34a and the algorithmic rollover process (changing from algorithm A to algorithm B, i.e. from ZSKa, KSKa to ZSKb, ZKZb) is complete.

It is also recognized that after publication of the fifth iteration DNS data 34a''''' in stage 924e, the system could start the repeat 926 the first stage 924a, however now utilizing the next algorithm C, as desired. In this manner, a regular set of stages 924a, 924b, 924c, 924d, 924e, 924a, 924b, 924c, 924d, 924e, etc. could be implemented by the DNS publication system 22, each separated by a respective hold down period 902a,b,c,d, as the cryptographic algorithms A,B,C are rolled over repeatedly. It is recognized that step 926 could contain a hold down period 902 as well, depending upon the amount of time between stage 924e and the repeat of stage 924a.

It is recognized that the DNSSEC records 106,106a can be provisioned 107 for the respective domain name(s) 14 as part of the setup of the domain name(s) 14, in order to specify whether the domain name(s) 14 are to be first "signed" or second "signed" (e.g. for specified record type(s) 26c) as it pertains to the DNS data 34,34a generated by the DNS publication service 22. For example, the DNSSEC records 106,106a of the generating instructions 105,105a could define particular record fields, permitted values, etc. used to contain generated signatures obtained from the signature module 204b, 205b (see FIG. 3) by the record generation module 204a, 205a (which would then use the definitions of the DNSSEC records 106,106a to generate instances thereof with the obtained signature data from the signature module 204b, 205b).

The provisioning 107 can include definitions of respective signing key records for the zone apex of the domain name 14 (e.g. the domain as compared to the subdomains). The provisioning 107 can be considered as generating metadata (e.g. configuration parameters for a set of DNSSEC signing keys SK1, SK2 as well as designating which of the record types 26c are to be signed or unsigned) for the zone with respect to how the DNS data 34,34a should be generated for the domains and subdomains of the domain name 14. For example, the generation instructions can include one or more signing identifiers 110,110a (e.g. the presence or absence of RRSIG record(s) 26a incorporated as part of the DNSSEC records 106,106a to be included in the DNS data 34,34a upon generation thereof).

For example, one embodiment of the signing identifier(s) 110,100a in the generation instructions 105, 105a could be presence of the RR set 26d (for a particular record type 26c), i.e. to include the RRSIG record 26a, recognizing that presence of the RRSIG record 26a would signify and necessitate that the particular record type 26c is to be signed upon generation of the DNS data 34a for that particular record type 26c by the signing system 204. It is recognized that for a signed zone, e.g. the entire zone, all of the resource records 26 (e.g. all of the record types 26c) would be designated as signed (e.g. definition of key sets would be present in the generation instructions 105, 105a). As an example of record types 26c for signing or not, for a signed zone (i.e. the provisioning 107 includes definition of a resource record key set): an A record type 26c is designated in the generation instructions 105, 105a as signed for use by respective authoritative servers 32 of the DNS 30; the Delegation Signer (DS) record type 26c is designated in the generation instructions 105, 105a as always signed; and Name Server (NS) record type 26c is designated in the generation instructions 105,105a as unsigned.

Another embodiment of the signing identifier 110,110a is an indication of record (type 26c) signed or record (type 26c) signed/unsigned for each pertinent domain/subdomain for a particular zone (for the associated domain name 14). As such, one or more of the components 200, 202, 204 would have access to the signing identifier(s) 110, 110a (e.g. in the generating instructions 105,105a) in order to guide the generation of the DNS data 34, 34a for selected registry data 23 (as obtained from the registry database 18), in tandem with the publication identifier 39,39a dictating which path (e.g. 11a, 11b) and thus defining which version (e.g. live or test) the respective DNS data 34,34a represents. For a considered signed domain name 14, it is recognized that the individual RR sets 26d (of the RR transfer set 34,34a—see FIG. 2) can contain signed records, as dictated by the generation instructions 105, 105a and associated DNSSEC records 106 (or not) and the signing identifier(s) 110, 110a. For a considered signed domain name 14, it is recognized that the individual RR sets 26d (of the RR transfer set 34, 34a—see FIG. 2) can contain both signed records and unsigned records, as dictated by the generation instructions 105, 105a and associated DNSSEC records 106,106a (or not) and the signing identifier(s) 110, 110a defining which signing key(s) SK1, SK2 to use.

Publication Switching of DNS Data 34,34a

As such, it is recognized that the current version DNS data 34 can be considered the first signed domain and the next version DNS data 34a can be considered the second signed domain for the set of registry data 23. As such, in order to change particular live domain name(s) 14 (e.g. as implemented in the DNS 30) from first signed to second signed or from second signed to first signed, the provisioning 107 (defining of the generation instructions 105,105a and related DNSSEC records 106,106a and signing identifier(s) 110, 110a) would be amended (e.g. by an administrator of the DNS publication service 22 upon request of the registrant 12 and/or registrar 16) to reflect such the change (e.g. between first signed and second signed), in order for the DNS publication service 22 to subsequently generate (post change in the provisioning 107) the appropriate DNS data 34,34a that is published to the DNS 30, as provided for by the various stages 904a,b and 914a,b,c. For example, part of the provisioning 107 step for the particular domain name(s) 14 would be the administrator defining/configuring the generation instructions 105,105a (and applicable DNSSEC records 106,106a and identifier(s) 110,110a) for each of the relevant record types 26c of the relevant domain name(s) 14 prior to subsequent generation of the DNS data 34,34a by the DNS publication service 22.

For example, the provisioning 107 by the administrator could designate/assign the set of generation instructions 105a to the generation of the next version DNS data 34a and designate/assign the set of generation instructions 105 to the generation of the current version DNS data 34. It is also recognized that as part of the generation instructions 105, 105a, the publication identifiers 39,39a and signing identifiers 110,110a could also be provisioned 107 by the system administrator.

For example, if the DNS data 34 was intended for publication (i.e. transmitted on the path 11a to the DNS 30), the publication identifier 39 would be designated as "publish", thus instructing the publication module 202a to send the DNS data 34 directly to the DNS 30 once generated. Similarly, the DNS data 34a would be intended for testing (i.e. transmitted on the path 11b to the publication storage 19), the publication identifier 39a would be designated as "not/inhibit publish", thus instructing the publication module 202a to send the deemed next version DNS data 34a directly to the publication storage once generated. In a further embodiment, for example, if the DNS data 34a was intended for publication (i.e. transmitted on the path 11a to the DNS 30), the publication identifier 39a would be designated as "publish", thus instructing the publication module 202a to send the DNS data 34a directly to the DNS 30 once generated. Similarly, the DNS data 34 would be intended for testing (i.e. transmitted on the path 11b to the publication storage 19), the publication identifier 39 would be designated as "not/inhibit publish", thus instructing the publication module 202a to send the deemed next version DNS data 34 directly to the publication storage once generated.

One example of the publication identifiers 39,39a (e.g. a publication mechanism) would be an enabled pointer to the publication module 202a (or a lack of a pointer or otherwise a disabled pointer) in the generation instructions 105, 105a. For example, if the pointer (e.g. publication identifier 39) for the DNS data 34 was enabled, then once the generation of the DNS data 34 is completed the pointer 39 would direct the record generation module 204*a*,205*a* (see FIG. 3) to send the generated DNS data 34 to the publication module 202*a*. In this example, the pointer 39 is consulted by the record generation module 204*a*. The role of the publication module 202*a* (as configured by the provisioning 107, for example) would be to publish to the DNS 30 any DNS data 34 received by the publication module 202*a*, with predefined knowledge (e.g. stored publication/transmission instructions) of which network 11 address(es) (of one or more of the DNS servers 32) for the respective domain name 14 the DNS data 34 should be sent/transmitted to (on the network path 11*a*). As such, once the publication module 202*a* receives the generated DNS data 34 (for a specified domain name 14), the role of the publication module 202*a* is to consult the defined network 11 address(es) (of the DNS server(s)) and thus send the generated DNS data 34 to the DNS 30 in the network path 11*a* that bypasses the registry database 18. In this example, the generated live version DNS data 34 is associated with the pointer 39 (e.g. "enable publication" identifier 39) to the DNS 30 (i.e. effectively designating the DNS data 34 as the live version). On the contrary, the generated next version DNS data 34*a* would not have a defined pointer to the DNS 30, thus inhibiting any publication of the next version DNS data 34*a* to the DNS 30. Instead, the next version DNS data 34*a* would have an "inhibit publication" pointer 39*a* (e.g. "enable publication" identifier 39) associated therewith, such that the inhibit publication pointer 39*a* would direct the record generation module 204*a* to direct the generated next version of the DNS data 34*a* to the publication storage 19 rather than to than to the DNS 30, in the path 11*b* that bypasses the DNS 30 (and preferably the registry database 18 as well). In this embodiment, it is recognized that the record generation module 204*a* consults the inhibit publication identifier 39*a* and acts accordingly.

A further example of the publication identifiers 39,39*a* (e.g. a publication mechanism) would be an enabled pointer to the DNS 30 (or a lack of a pointer or otherwise a disabled pointer) in the generation instructions 105, 105*a*. For example, if the pointer (e.g. enable publication identifier 39) for the DNS data 34 was enabled, then once the generation of the DNS data 34 is completed and received by the publication module 202*a*, the pointer 39 would direct the publication module 202*a* (see FIG. 3) to send the generated DNS data 34 to the DNS 30. In this example, the pointer 39 is consulted by the publication module 202*a*. The role of the publication module 202*a* (as configured by the provisioning 107, for example) would be to publish to the DNS 30 any DNS data 34 received by the publication module 202*a*, in the event the respective pointer 39 dictates such direction, with predefined knowledge (e.g. stored publication/transmission instructions) of which network 11 address(es) (of one or more of the DNS servers 32) for the respective domain name 14 the DNS data 34 should be sent/transmitted to (on the network path 11*a*). As such, once the publication module 202*a* receives the generated DNS data 34 (for a specified domain name 14), the role of the publication module 202*a* is to consult pointer 39 and the defined network 11 address(es) (of the DNS server(s)) and thus send the generated live version DNS data 34 to the DNS 30 in the network path 11*a* that bypasses the registry database 18. In this example, the generated live version DNS data 34 is associated with the pointer 39 (e.g. "enable publication" identifier 39) to the DNS 30 (i.e. effectively designating the DNS data 34 as the live version). On the contrary, the generated next version DNS data 34*a* would not have a defined pointer to the DNS 30, thus inhibiting any publication of the next version DNS data 34*a* to the DNS 30. Instead, the next version DNS data 34*a* would have an "inhibit publication" pointer 39*a* (e.g. "enable publication" identifier 39) associated therewith, such that the inhibit publication pointer 39*a* would direct the publication module 202*a* to direct the generated next version of the DNS data 34*a* to the publication storage 19 rather than to than to the DNS 30, in the path 11*b* that bypasses the DNS 30 (and preferably the registry database 18 as well). In this embodiment, it is recognized that the publication module 202*a* consults the inhibit publication identifier 39*a* and acts accordingly.

A further example of the publication identifiers 39,39*a* (e.g. a publication mechanism) could be a specific publication flag associated with a particular set of DNS data 34,34*a*, e.g. as defined in the generation instructions 105,105*a*, such that consultation of the publication identifiers 39,39*a* (e.g. having either an enable publication identifier or inhibit publication value) by the publication module 202*a* and/or the record generation module 204*a*,205*a* would provide instructions as to which location (either the DNS 30 via path 11*a* or the publication storage 19 via path 11*b*) the generated DNS data 34,34*a* should be sent/transmitted. In any event, it is recognized that one or more modules of the component 202 (e.g. including the component 200) and/or of the component 204 would consult the publication identifiers 39,39*a* (e.g. as publication pointers and/or as publication flags). It is also recognized that the publication identifiers 39,39*a* can use the described publication mechanism embodiments, or other publication mechanism embodiments as desired. Further, it is recognized that the publication identifiers 39,39*a* can both be the same publication mechanism (e.g. both publication flags) or different publication mechanisms (e.g. one as a publication flag and the pother as the publication pointer).

In terms of changing from a second signed domain to a first signed domain, once testing/validation of the next version DNS data 34*a* is complete, the administrator could: (1) instruct the DNS publication system 22 (e.g. distribution system 202) to stop publication of the live version DNS data 34 to the DNS 30 (e.g. disable the publication module 202*a* for example by disabling/deleting the publication identifier 39 and/or any information concerning the network address(es) of the DNS 30); (2) then provision 107 the domain by essentially switching the generation instructions 105,105*a* (e.g. pointing from the instructions 105 to the instructions 105*a* for the live version DNS data by designating the publication identifier 39 as "not/inhibit publish" and the publication identifier 39*a* as "publish) and any other DNS related instructions/records (106 to 106*a*)/identifiers (110 to 110*a*) to include respective generated keys with respect to the apex of the domain; and (3) would then instruct the DNS publication system 22 (e.g. the publication module 202*a*) to resume publication but now designating the now considered live version DNS data 34*a* (i.e. replacing the previously live DNS data 34 with the new live version DNS data 34*a*). Accordingly, then the distribution system 202 would involve the signing system 204 for subsequently generated DNS data 34*a*, for example as per any of the below-described embodiments A,B,C,D for implementing signing of the zone.

As such, as described, switching of sending the DNS data 34*a* to the DNS 30, as compared to the DNS data 34, can be performed by modification of the publication identifier 39,39*a*. Alternatively, the generation instructions 105, 105*a* could be switched between the DNS data 34,34*a*, thus once testing is complete and the publication module 202*a* is disabled (thus restricting any publication of any DNS data 34 to the DNS 30 while the switch is being provisioned) the generation instructions 105 (and associated records 106 and signing identifier(s) 110) would be used (e.g. directed) to generate the live DNS data 34a (sent to the DNS 30) and optionally the generation instructions 105a (and associated records 106a and signing identifier(s) 110a) could be used to generate, if needed, as the next DNS data 34a (sent to the publication storage 19). In this manner, the DNS records 26 used by the DNS 30 would be switched from the previously generated (prior to switching) the DNS data 34a to the DNS data 34.

It is considered that designation of the specific generating instructions 105,105a (to be used) to generate a selected version of the DNS data 34,34a could also be considered as a configuration embodiment of the publication identifiers 39,39a. For example, in deciding to switch from the DNS data 34 (sent to the DNS 30) to the DNS data 34a (sent to the DNS 30), the administrator could simply switch the generation instructions 105 to the generation instructions 105a (incorporating the DNSSEC records 106 to 106a and the signing identifiers 110 to 110a). Thus, any newly generated DNS data would be performed by the component(s) 202,204 using the generation instructions 105a, in effect changing the current version DNS data 34 to the new next version DNS data 34a.

In terms of changing from a first signed domain to an second signed domain, once testing/validation of the next version DNS data 34 is complete, the administrator could: (1) instruct the DNS publication system 22 (e.g. distribution system 202) to stop publication of the live version DNS data 34a to the DNS 30 (e.g. disable the publication module 202a); (2) then provision 107 the domain by optionally switching the generation instructions 105,105a (e.g. pointing from the instructions 105a to the instructions 105 for the live version DNS data, and/or designating the publication identifier 39a as "not/inhibit publish" and the publication identifier 39 as "publish) and optionally any other DNS related instructions/records (106a to 106)/identifiers (110a to 110) to include respective generated keys with respect to the apex of the domain; and (3) would then instruct the DNS publication system 22 (i.e. the publication module 202a) to resume publication but now designating the live version DNS data 34 (i.e. replacing the DNS data 34a with the DNS data 34). Accordingly, then the distribution system 202 would involve the signing system 204 for subsequently generated DNS data 34, for example as per any of the below-described embodiments A,B,C,D for implementing signing of the zone.

Figure 7:
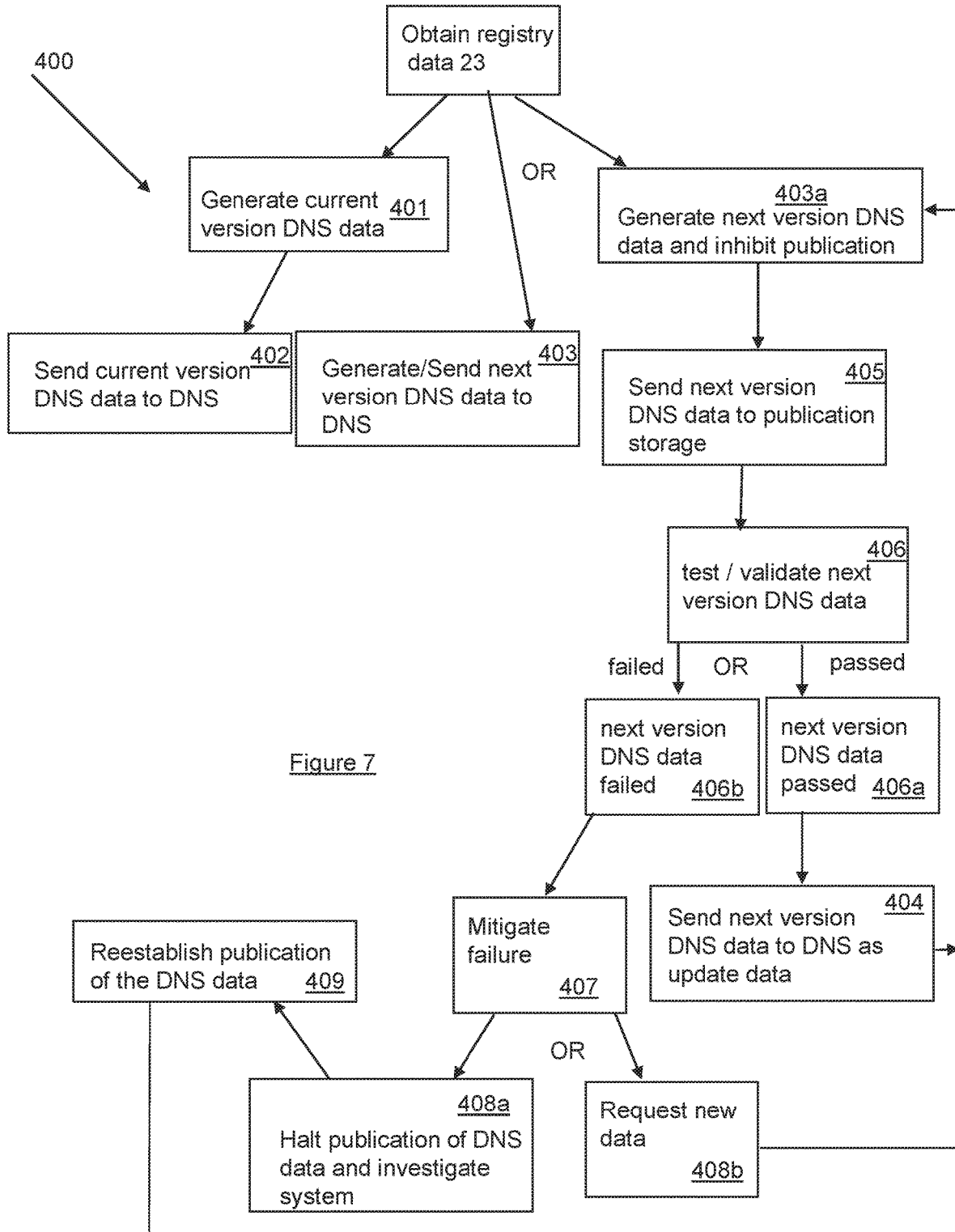
FIG. 7 is an example operation of the publication switching of the DNS data of the system of FIG. 3.

Referring to FIG. 7, shown is a diagrammatic method 400 of publication of the DNS records 26 to the DNS 30 (e.g. previously sent DNS data 34 is updated 404 to the now ready update version DNS data 34b). In this manner, via the publication system 22: one can operate 402 the domain name 14 using a version DNS data 34 by previously sending 401 to the DNS 30; as well as concurrently generate 403a and send 405 to publication storage and next/validate 406 the next version DNS data 34a. Alternatively, the next DNS data can be sent 403 directly to the DNS 30, thereby bypassing the testing/validation facilities 21.

If sent for testing/validation, the next DNS data 34a would either pass 406a or fail 406b the testing/validation. If passed, the next DNS data 34a would become the resultant update DNS data 34b and would be sent 404 to the DNS 30. Subsequent next version DNS data 34a would be generated at step 403,403a.

Alternatively, if failed, the publication system 22 would be employed at step 407 to mitigate or otherwise deal with the failure. For example, at step 407 the failed next DNS data 34a would simply be stored in the failed testing storage 19a or otherwise deleted. Alternatively, the system 22 could request 408b new/replacement data 23 from the registry database 18 and then start again at step 403a with an effort to result in a successful testing/validation at step 406a. Alternatively, the system 408b could request 408b that the signing system 204 resign the original DNS data 34a in an attempt to correct the failed testing/validation by continuing at step 403a (with efforts to result in a successful testing/validation at step 406a). Alternatively, in the event it is deemed a systemic failure of the publication system 22, then at step 407 it could be decided that the publication system 22 be halted 408a and the system 22 investigated for any systemic/fundamental defects. Once corrected, regular operation of the publication system 22 could reestablished at step 409 and the next DNS data 34 generated at step 403a, for example.

Other DNSSEC records 106,106a stored in the DNSSEC storage 19a can include records such as but not limited to: DNS Public Key (DNSKEY); and Delegation Signer (DS). In any event, it is recognized that the DNSSEC records 106,106a are not stored in the registry storage 18 along with the other registry data 23 pertaining to the domain name(s) 14, rather the DNSSEC records 106,106a are stored in the DNSSEC storage 19a as made available to the DNS publication service 22. It is further recognized that the generated DNS data 34,34a including (or not) any DNSSEC related data (e.g. values of the RRSIG record 26a, etc.), is also not stored in the registry database 18 subsequent to generation of the DNS data 34,34a. Rather, the/update version DNS data 34,34b once generated (and subjected to testing/validation if selected via the configured publication identifier 39,39a to not by pass the publication storage 19) by the DNS publication service 22, is transmitted directly to the DNS servers 32 of the DNS 30 in a network path 11a (see FIG. 1) that bypasses the registry database 18.

Generation of Current Version DNS Data 34 for Transmission to the DNS 30

Referring again to FIGS. 3, 8 there are considered a number of different operational embodiments of the DNS publication service 22. It is recognized that each of the operational embodiments for each respective component 200,202,204 could also be compatible with the other operational embodiments for each of the other respective components 200,202,204. It is envisioned that the particular DNS data 34,34a (e.g. provisioned as signed or unsigned for the DNS 30) can be generated and published (e.g. to the DNS 30) as described. In this regard, the particular DNs data 34,34a is being generated as the current version DNS data 34,34a and published (i.e. to the DNS 30) as such. It is recognized that the next version DNS data 34a and the current version DNS data 34 are being generated concurrent by the DNS publication system 22, such that the current version DNS data 34 is sent to the DNS 30 and the next version DNS data 34a is sent to the publication storage 19.

Concerning the obtaining/receipt of the registry data 23 via the record selection module 200. In one embodiment A for the component 200, the registry data 23 (pertaining to the record types 26c of the DNS data 34) could be pushed to the record selection module 200 by the registry operator 20 (as collected from the registry database 18), upon the registry operator 20 processing a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or for existing domain name(s) 14.

In a further embodiment B for the component 200, the registry data 23 (pertaining to the record types 26*c* of the DNS data 34) could be pulled by the record selection module 200 from the registry operator 20 (as collected from the registry database 18), upon monitoring and detecting by the record selection module 200 that the registry operator 20 processed a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or existing domain name(s) 14. It is recognized that any/all of the functionality of the record selection module 200 and the distribution system 202 can be combined in one system/module as desired, or can be separated as described by example only.

Concerning generation of DNS data 34 as first signed by the distribution system 202 (i.e. component 202), utilizing the registry data 23 as provided by the record selection module 200 (i.e. those registry data 23 obtained/received from the registry database 18). In an embodiment A for the component 202, the distribution system 202 would (1) receive the registry data 23, (2) would optionally consult the generation instructions 105 (and/or associated signing identifier(s) 110) in order to identify that the resource records 26 pertaining to the registry data 23 are to remain first signed (e.g. the signing identifier(s) 110 indicate that the record type(s) 26*c* are to be first signed), (3) would send the registry data 23 to the signing system 204 in order for the signing system 204 to generate the DNS data 34 using the generation instructions 105, (4) would receive the DNS data 34 from the signing system 204, and (5) would send the DNS data 34 in a transmission path 11*a* to the DNS 30 that bypasses the registry database 18. In this embodiment A for the component 202, the signing system 204 is used to generate the DNS data 34. One advantage to this embodiment A for component 202 is that signing system 204 computing resources (e.g. for publishing the DNS data 34) are not utilized needlessly.

In a further embodiment B for the component 202, the distribution system 202 would (1) receive the registry data 23, (2) would optionally consult the generation instructions 105 (and/or associated signing identifier(s) 110) in order to identify that the resource records 26 pertaining to the registry data 23 are to be first signed (e.g. the signing identifier(s) 110 indicate that the record type(s) 26*c* are to be first signed), (3) would send the registry data 23 to the signing system 204 in order for the signing system 204 to generate the DNS data 34 using the generation instructions 105, and (4) the signing system 204 would send the DNS data 34 in transmission paths 22*b*,11*a* to the DNS 30 that bypass the registry database 18 and the distribution system 202. In this embodiment B for the component 202, the signing system 204 is used to generate the DNS data 34 as well as to publish the generated DNS data 34. One advantage to this embodiment B for component 202 is that the distribution system 202 computing resources (e.g. for publishing the DNS data 34) are not utilized needlessly.

Concerning generation of DNS data 34 as unsigned and/or signed by the signing system 204 (i.e. component 204), utilizing the registry data 23 as provided by the record selection module 200 and/or the distribution system 202 (i.e. those registry data 23 obtained/received from the registry database 18). In one embodiment A for the component 204, the signing system 204 would (1) receive the registry data 23 from the component 200,202, (2) would consult the generation instructions 105 (and associated signing identifier(s) 110) in order to identify which of the corresponding resource records 26 are to be signed (e.g. the signing identifier(s) 110 indicate that the record type(s) 26*c* are to be signed using SK1—as well as if relevant where any of the record type(s) 26*c* are to remain unsigned), (3) would generate the DNS data 34 using the generation instructions 105, and (4) would send the DNS data 34 in transmission paths 11*a*,22*b* to the DNS 30 that bypass the distribution system 202 as well as the registry database 18. One advantage to this embodiment A for component 204 is that the distribution system 202 computing resources (e.g. publishing resource records 26) are not utilized needlessly.

In a further embodiment B for the component 204, the signing system 204 would (1) receive the registry data 23, (2) would consult the generation instructions 105 (and/or associated signing identifier(s) 110) in order to identify which of the resource records 26 are to remain unsigned and those to be signed—e.g. the signing identifier(s) 110 indicate that the record type(s) 26*c* are to be signed using SK1), (3) would generate the DNS data 34 using the generation instructions 105, and (4) would send the DNS data 34 to the distribution system 202, which would send the DNS data 34 in the transmission paths 22*a*,11*a* to the DNS 30 that bypass the registry database 18. In this embodiment B for the component 204, the signing system 204 is used to generate the DNS data 34, while the distribution system 202 is used to publish the generated DNS data 34 to the DNS 30.

In a further embodiment C for the component 204, (1) the record selection module 200 would receive the registry data 23, (2) the record selection module 200 would consult the generation instructions 105 (and/or associated signing identifier(s) 110) in order to identify which of the resource records 26 are to remain unsigned and those that are to be signed—e.g. the signing identifier(s) 110 indicate that the record type(s) 26*c* are to be signed using SK1), (3) the record selection module 200 would send the registry data 23 and identify those resource records 26 (e.g. a first record portion) as unsigned to the distribution system 202 in order for the distribution system 202 to generate the unsigned portion of the DNS data 34 using the generation instructions 105 and the registry data 23, (4) the record selection module 200 would identify those resource records 26 as signed (e.g. a second record portion) to the signing system 204 in order for the signing system 204 to generate the signed portion of the DNS data 34 using the generation instructions 105 and the registry data 23, and (5) one or more of the components 200,202,204 would send both the signed and unsigned portions of the DNS data 34 in the transmission path 11*a* to the DNS 30 that bypasses the registry database 18. In this embodiment C for the component 204, one advantage is that the signing system 204 computing resources (e.g. for signing the DNS data 34) are not utilized needlessly for resource records 26 that are to remain unsigned.

In a further embodiment D for the component 204, (1) the record selection module 200 would receive the registry data 23, (2) the record selection module 200 would consult the generation instructions 105 (and/or associated signing identifier(s) 110) in order to identify which of the resource records 26 are to remain unsigned and those that are to be signed—e.g. the signing identifier(s) 110 indicate that the record type(s) 26*c* are to be signed using SK1), (3) the record selection module 200 would send the registry data 23 and identify those resource records 26 (e.g. a first record portion) as unsigned to the signing system 204 in order for the distribution system 202 to generate the unsigned portion of the DNS data 34 using the generation instructions 105 and the registry data 23, (4) the record selection module 200 would also identify those resource records 26 as signed (e.g. a second record portion) to the signing system 204 in order for the signing system 204 to generate the signed portion of the DNS data 34 using the generation instructions 105 and the registry data 23, and (5) one or more of the components 200,202,204 would send both the signed and unsigned portions of the DNS data 34 in the transmission path 11*a* to the DNS 30 that bypasses the registry database 18. In this embodiment D for the component 204, one advantage is that the signing system 204 computing resources (e.g. for signing the DNS data 34) are not utilized needlessly for resource records 26 that are to remain unsigned.

It is recognized that for this embodiment D for the component 204, the signing system 204 does receive all of the registry data 23 for use in generation of the DNS data 34, however identification of which resource records 26 are to be unsigned (the first record portion) and which resource records 26 are to be signed (the second record portion) has already been processed by the record selection module 200 in advance of sending the registry data 23 to the signing system 204. As such, in this embodiment D for the component 204, a further advantage is that the signing system 204 computing resources (e.g. for identifying which of the resource records 26 are for signing or not) are not utilized needlessly for resource records 26 that are to remain unsigned. Identification of the first portion of the resource records 26 and the second portion of the resource records 26 can be embodied as a checklist 27 (indicating whether a particular resource record 26 of the set of resource records 26 sent to the signing system 204 is to be signed or unsigned), such that the resource records 26 identified as unsigned are listed/generated in the checklist 27 prior to sending the registry data 23 to the signing system 204. Accordingly, both the registry data 23 and the checklist 27 are received by the signing system 204, such that the signing system 204 can consult the checklist 27 and send the second portion of the resource records 26 to a signing module 204*b*, 205*b* (of the signing system 204) and the first portion of the resource records 26 in a path that bypasses the signing module 204*b*,205*b*.

Generation of Next Version DNS Data 34*a* for Transmission to the Publication Storage 19

Referring again to FIGS. 3 and 7, there are considered a number of different operational embodiments of the DNS publication service 22. It is recognized that each of the operational embodiments for each respective component 200,202,204 could also be compatible with the other operational embodiments for each of the other respective components 200,202,204. It is envisioned that the particular next version DNS data 34,34*a* (e.g. provisioned as first signed or second signed for the publication storage 19) can be generated and stored (e.g. to the publication storage 19) as described. In this regard, the particular DNS data 34,34*a* is being generated as the next version DNS data 34,34*a* and sent (i.e. to the publication storage 19) as such. It is recognized that the next version DNS data 34*a* and the version DNS data 34 are being generated concurrently by the DNS publication system 22, using different signing key(s) SK1, SK2 respectively, such that the version DNS data 34 is sent to the DNS 30 and the next version DNS data 34*a* is sent to the publication storage 19.

Concerning the obtaining/receipt of the registry data 23 via the record selection module 200. In one embodiment A for the component 200, the registry data 23 (pertaining to the record types 26*c* of the DNS data 34*a*) could be pushed to the record selection module 200 by the registry operator 20 (as collected from the registry database 18), upon the registry operator 20 processing a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or for existing domain name(s) 14. In a further embodiment B for the component 200, the registry data 23 (pertaining to the record types 26*c* of the DNS data 34*a*) could be pulled by the record selection module 200 from the registry operator 20 (as collected from the registry database 18), upon monitoring and detecting by the record selection module 200 that the registry operator 20 processed a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or existing domain name(s) 14. It is recognized that any/all of the functionality of the record selection module 200 and the distribution system 202 can be combined in one system/module as desired, or can be separated as described by example only.

In an embodiment A for the component 202, the distribution system 202 would (1) receive the registry data 23, (2) would optionally consult the generation instructions 105*a* (and/or associated signing identifier(s) 110) in order to identify that the resource records 26 pertaining to the registry data 23 are to be second signed (e.g. the signing identifier(s) 110*a* indicate that the record type(s) 26*c* are to be signed by SK2), (3) would send the registry data 23 to the signing system 204 in order for the signing system 204 to generate the DNS data 34*a* using the generation instructions 105*a*, (4) would receive the DNS data 34*a* from the signing system 204, and (5) would send the DNS data 34*a* in a transmission path 11*b* to the publication storage 19 that bypasses the registry database 18.

In a further embodiment B for the component 202, the distribution system 202 would (1) receive the registry data 23, (2) would optionally consult the generation instructions 105*a* (and/or associated signing identifier(s) 110*a*) in order to identify that the resource records 26 pertaining to the registry data 23 are to be second signed (e.g. the signing identifier(s) 110*a* indicate that the record type(s) 26*c* are to be signed using SK2), (3) would send the registry data 23 to the signing system 204 in order for the signing system 204 to generate the DNS data 34*a* using the generation instructions 105*a*, and (4) the signing system 204 would send the DNS data 34*a* in transmission paths 22*b*,11*b* to the publication storage 19 that bypass the registry database 18 and the distribution system 202. In this embodiment B for the component 202, the signing system is used to generate the DNS data 34*a* as well as to store the generated DNS data 34*a*. One advantage to this embodiment B for component 202 is that the distribution system 202 computing resources (e.g. for storing the DNS data 34*a*) are not utilized needlessly.

Concerning generation of DNS data 34*a* as unsigned and/or signed by the signing system 204 (i.e. component 204), utilizing the registry data 23 as provided by the record selection module 200 and/or the distribution system 202 (i.e. those registry data 23 obtained/received from the registry database 18). In one embodiment A for the component 204, the signing system 204 would (1) receive the registry data 23 from the component 200,202, (2) would consult the generation instructions 105*a* (and associated signing identifier(s) 110*a*) in order to identify which of the corresponding resource records 26 are to be signed (e.g. the signing identifier(s) 110 indicate that the record type(s) 26*c* are to be signed using SK2—as well as if relevant where any of the record type(s) 26*c* are to remain unsigned), (3) would generate the DNS data 34*a* using the generation instructions 105*a*, and (4) would send the DNS data 34*a* in transmission paths 11*b*,22*b* to the publication storage 19 that bypass the distribution system 202 as well as the registry database 18. One advantage to this embodiment A for component 204 is that the distribution system 202 computing resources (e.g. storing resource records 26) are not utilized needlessly.

In a further embodiment B for the component 204, the signing system 204 would (1) receive the registry data 23, (2) would consult the generation instructions 105*a* (and/or associated signing identifier(s) 110*a*) in order to identify which of the resource records 26 are to remain unsigned and those to be signed (e.g. the signing identifier(s) 110*a* indicate that the record type(s) 26*c* are to be unsigned/signed using SK2), (3) would generate the DNS data 34*a* using the generation instructions 105*a*, and (4) would send the DNS data 34*a* to the distribution system 202, which would send the DNS data 34*a* in the transmission paths 22*a*,11*b* to the publication storage 19 that bypass the registry database 18. In this embodiment B for the component 204, the signing system 204 is used to generate the DNS data 34, while the distribution system 202 is used to store the generated DNS data 34*a* to the publication storage 19.

In a further embodiment C for the component 204, (1) the record selection module 200 would receive the registry data 23, (2) the record selection module 200 would consult the generation instructions 105*a* (and/or associated signing identifier(s) 110*a*) in order to identify which of the resource records 26 are to remain unsigned and those that are to be signed (e.g. the signing identifier(s) 110*a* indicate that the record type(s) 26*c* are to be unsigned/signed using SK2 where appropriate), (3) the record selection module 200 would send the registry data 23 and identify those resource records 26 (e.g. a first record portion) as unsigned to the distribution system 202 in order for the distribution system 202 to generate the unsigned portion of the DNS data 34*a* using the generation instructions 105*a* and the registry data 23, (4) the record selection module 200 would identify those resource records 26 as signed (e.g. a second record portion) to the signing system 204 in order for the signing system 204 to generate the signed portion of the DNS data 34*a* using the generation instructions 105*a* and the registry data 23, and (5) one or more of the components 200,202,204 would send both the signed and unsigned portions of the DNS data 34*a* in the transmission path 11*b* to the publication storage 19 that bypasses the registry database 18. In this embodiment C for the component 204, one advantage is that the signing system 204 computing resources (e.g. for signing the DNS data 34*a*) are not utilized needlessly for resource records 26 that are to remain unsigned.

In a further embodiment D for the component 204, (1) the record selection module 200 would receive the registry data 23, (2) the record selection module 200 would consult the generation instructions 105*a* (and/or associated signing identifier(s) 110*a*) in order to identify which of the resource records 26 are to remain unsigned and those that are to be signed (e.g. the signing identifier(s) 110*a* indicate that the record type(s) 26*c* are to be unsigned/signed using SK2 where appropriate), (3) the record selection module 200 would send the registry data 23 and identify those resource records 26 (e.g. a first record portion) as unsigned to the signing system 204 in order for the distribution system 202 to generate the unsigned portion of the DNS data 34*a* using the generation instructions 105 and the registry data 23, (4) the record selection module 200 would also identify those resource records 26 as signed (e.g. a second record portion) to the signing system 204 in order for the signing system 204 to generate the signed portion of the DNS data 34*a* using the generation instructions 105*a* and the registry data 23, and (5) one or more of the components 200,202,204 would send both the signed and unsigned portions of the DNS data 34*a* in the transmission path 11*b* to the publication storage 19 that bypasses the registry database 18. In this embodiment D for the component 204, one advantage is that the signing system 204 computing resources (e.g. for signing the DNS data 34*a*) are not utilized needlessly for resource records 26 that are to remain unsigned.

It is recognized that for this embodiment D for the component 204, the signing system 204 does receive all of the registry data 23 for use in generation of the DNS data 34*a*, however identification of which resource records 26 are to be unsigned (the first record portion) and which resource records 26 are to be signed (the second record portion) has already been processed by the record selection module 200 in advance of sending the registry data 23 to the signing system 204. As such, in this embodiment D for the component 204, a further advantage is that the signing system 204 computing resources (e.g. for identifying which of the resource records 26 are for signing or not) are not utilized needlessly for resource records 26 that are to remain unsigned. Identification of the first portion of the resource records 26 and the second portion of the resource records 26 can be embodied as a checklist 27 (indicating whether a particular resource record 26 of the set of resource records 26 sent to the signing system 204 is to be signed or unsigned), such that the resource records 26 identified as unsigned are listed/generated in the checklist 27 prior to sending the registry data 23 to the signing system 204. Accordingly, both the registry data 23 and the checklist 27 are received by the signing system 204, such that the signing system 204 can consult the checklist 27 and send the second portion of the resource records 26 to a signing module 204*b*,205*b* (of the signing system 204) and the first portion of the resource records 26 in a path that bypasses the signing module 204*b*,205*b*.

Signing Module 204*b*

For example, referring to FIGS. 3,8, the signing module 204*b* (or if so configured the signing module 205*b*) performs the function of generating the actual signatures (for population of respective signature records of the DNS data 34,34*a*) using the private keys defined in the generation instructions 105,105*a* of the domain. The signing module 204*b*,205*b* could be a hardware security module (HSM), as a physical computing device used to safeguard and manage digital keys for strong authentication and provision of cryptoprocessing. The HSM modules 204*b*,205*b* can be embodied in the form of a plug-in card or an external device (containing one or more secure cryptoprocessor chips) that attaches directly to a computer or network server of the signing system 204. For example, the HSM module(s)

204b,205b can be used to store the key material used to sign the zone files/records (e.g. the DNS data 34). A recognized open source tool for managing signing of DNS zone files using HSM 204b,205b is OpenDNSSEC. In terms of a DNS record generation module 204a (or if so configured the record generation module 205a), this module can be responsible for building the RR sets 26d of the DNS data 34, in particular requesting signatures from the signing module 204b,205b and incorporating the received signatures using DNS syntax (e.g. stored in the generating instructions 105, 105a) to build/generate the DNS data 34. As such, the signing system 204 can be implemented as a multifunctional module for both the signature generation and RR set 26d generation functions. Usually the same signing module 204,205 is used for both the version DNS data 34 and the next version DNS data 34a, however if different modules 204,205 are used, then both different signing modules 204, 205 would need to contain synched versions of the private key portions of the crypto material/algorithm.

Alternatively, the signing system 204 can be subdivided into dedicated one or more signing modules 204b,205b and dedicated one or more DNS record modules 204a, 205a. It is also recognized that in the case of the unsigned zone portions, the distribution system 202 can include a DNS record module 204a,205a for generating the unsigned DNS data 34,34a portions, or can rely upon a respective DNS record module 204a,205a of the signing system 204 in order to generate the unsigned DNS data 34,34a portions for the signed zone. Further, it is recognized that the distribution system 202 and/or the signing system 204, depending upon the embodiment A,B,C,D of the components 200,202,204 implemented, can have a publication module 202a for use in receiving the DNS data 34,34a once generated and then sending/transmitting to the DNS 30 using the respective transmission path 11a,11b. For example, the publication module 202a would be aware of the network 11 addresses for one or more of the DNS servers 32 (e.g. super nodes) associated with the DNS 30, in order to coordinate reception of the live version DNS data 34 (e.g. as generated by the DNS record module 204a,205a) and then subsequent transmission over the network path 11a to one or more of the DNs servers 32 of the DNS 30. For example, the publication module 202a would be aware of the network 11 address for the publication storage 19, in order to coordinate reception of the next version DNS data 34a (e.g. as generated by the DNS record module 204a,205a) and then subsequent transmission over the network path 11b to the publication storage 19.

The signing module 204b,205b can be embodied as a DNSSEC key management and a signing appliance like Secure64® DNS Signer, BlueCat Networks, Xelerance DNSX Secure, Signer, and Infoblox. Such appliances may provide various aspects of key management and zone signing, but require hardware to be installed.

In terms of FIGS. 3 and 8, it is noted that for FIG. 3, the same DNS record generation module 204a can be used to generate the DNS records 26 in both DNS data 34,34a, using the appropriate generation instructions 105,105a (e.g. including the signing identifiers 110,110a, publication identifiers 39,39a and/or DNS record data 106,106a). Similarly, the same signature module 204b can be used to implement both the SK1 for the DNS data 34 and the SK2 for the DNS data 34a. On the contrary, for FIG. 8, different DNS record generation modules 204a, 205a can be used to generate the DNS records 26 for the respective DNS data 34,34a, using 1) the appropriate generation instructions 105 (e.g. including the signing identifiers 110, publication identifiers 39 and/or DNS record data 106) for the DNS record module 204a and 2) the appropriate generation instructions 105a (e.g. including the signing identifiers 110a, publication identifiers 39a and/or DNS record data 106a) for the DNS record module 205a. Similarly, the signature module 204b can be used to implement the SK1 for the DNS data 34 and the signature module 205b can be used to implement the SK2 for the DNS data 34a. This process could be used to implement redundancy for the DNS publication system 22.

DNS 30 and DNSSEC

Referring to FIGS. 1 and 2 and 3,8 the DNSSEC process (and for that matter the testing facilities 21) is utilized by the DNS servers 32 of the DNS 30 to utilize digitally signed live version DNS data 34 (e.g. digitally signed DNS records also referred to as one or more Resource Record sets (RR set) 26d) at the authoritative DNS server (of the DNS servers 32) with encryption technology (e.g. public-key cryptography). It is also recognized that some of the resource records 26 (as part of the RR set(s) 26d) can also be unsigned (i.e. do not include a respective RRSIG record 26b associated as part of the RR set 26a of a particular record type 26c). Some of the registry data 23 for the resource records 26, used as part of the live version DNS data 34, are obtained from the registry database 18 associated with the particular domain name 14 (e.g. website URL), e.g. obtained by the DNS publication service 22 from the registry data base 18 and/or provided to the DNS publication service 22 by the registry operator 20, for example. In particular, it is recognised that the registry data 23 of the registry database 18 only contain unsigned registry data 23. As such, any record(s) contained in the RR set 26d relating to DNSSEC (e.g. the RRSIG record 26a) is/are incorporated into the RR set 26d by a signing system 204 of the DNS publication system 10, see FIG. 4, and as such are not obtained by the DNS publication service 22 from the registry database 18 in performance of generating the live version DNS data 34 for subsequent publication to the DNS servers 32 of the DNS 30. Other DNSSEC related resource records 26 of the live version DNS data 34 can include records such as but not limited to: DNS Public Key (DNSKEY); Delegation Signer (DS); Next Secure (NSEC/NSEC3); as well as DNS header flags of Checking Disabled (CD) and Authenticated Data (AD).

In terms of the next version DNS data 34a, as stored in the publication storage 19, the testing facilities 21 could be implemented as a set of instructions stored in a storage and executing on a computer processor (e.g. a server) in order to perform their respective functions (e.g. processing) on the registry data 23 and/or the DNS records 26. Alternatively, the testing facilities 21 could be implemented as a hardware (e.g. a solid state device) having storage and one or more computer processors in order to perform their respective functions (e.g. processing) on the registry data 23 and/or the DNS records 26. Alternatively, the testing facilities 21 could each implemented as a combination of a set of instructions stored in a storage and executing on a computer processor and a hardware (e.g. a solid state device) having storage and one or more computer processors in order to perform their respective functions (e.g. processing) on the registry data 23 and/or the DNS records 26. In terms of the functionality of the testing facilities/service 21, the live version DNS data 34 would be used as a baseline version by the testing service 21 in order to compare against/with the next version DNS data 34a. For example, as each next version DNS data 34a is generated, the testing service 21 would receive the generated next version DNS data 34a and compare each of the DNS records 26 in the next version DNS data 34a against each of the DNS records 26 contained in the live version DNS data 34, in order to determine: 1) every DNS record 26 requiring a signature contains a signature record 26a; 2) every zone defined in the generating instructions 105. 105a is present and contains the requisite DNS records 26; determine if the signature records 26a contained are valid signatures; and/or the validity of the zone is not affected by the changes present in DNS records 26 in the next version DNS data 34a.

As further described, it is also recognized that the live version DNS data 34 is not stored in the registry data base 18, rather the DNS data 34 is generated (on demand) by the DNS publication service 22 as needed (e.g. due to recognized/identified DNS pertinent changes to the registry data 23 stored in the registry database 18). Once generated by the DNS publication service 22, the DNS data 34 is submitted directly to the DNS servers 32 of the DNS 30 using transmission path 11a, or to the publication storage 19 via the network path 11b, as dictated by the respective publication identifiers 39.

In general, the DNS data 34 (aka DNS records or zone files referred to as a Resource Record transfer/transaction 34) are instructions that are published (e.g. transmitted or eventually transmitted to the DNS servers 32) by the DNS publication service 22 to the (authoritative) DNS servers 32. The DNS data 34 provides information about a domain name 14 including what IP address is associated with that domain name 14 and how to handle requests (e.g. DNS requests from the users 13) associated with network resources 31 for that domain name 14. For example, a DNS record 26 can be defined as a single entry of the DNS data 34 that gives zone instructions on how to handle any given DNS 30 related request based on record type 26c. In general, most every DNS record 26 has at least three pieces of information, namely: a Record Name; Record Value/Data; and Time to Live (TTL).

These DNS records 34 consist of a series of text files written in what is known as DNS syntax. DNS syntax can be a string of characters used as commands, which instruct the DNS server 32 what to do upon receiving a DNS lookup request from the network user 13, for example. All DNS records 34 can also have a 'TTL', which stands for time-to-live, and indicates how often a DNS server 32 would refresh that particular DNS record 34. Accordingly, all domains are required to have at least a few essential DNS records 34 for the user 13 to be able to access the website(s) associated with the domain name 14, amongst other optional additional DNS 30 implemented functionality.

Referring again to FIG. 2, for signed versions of the DNS data 34, i.e. those including the RRSIG 26a, when DNSSEC is used (i.e. the particular RR set 26d is digitally signed), each answer provided by the DNS server 32 (e.g. to a received DNS lookup of the user 13) would contain the RRSIG record 26a, in addition to other record types 26c that were requested. As such, the RRSIG record 26a represents a digital signature of the answer DNS resource record set, i.e. RR set 26d containing one or more resource records 26 of the same record type 26c. Further, the digital signature contained in the RRSIG record 26a can be verified by the server (e.g. resolver server used by the user 13 in processing the DNS lookup/access to the network resource 31) communicating with the DNS server 32 by locating the correct public key found in the DNSKEY record of the DNS data 34. It is further recognized that each RR set 26d can contain one or more resource records 26 of the same record type 26c. Further, each RR set 26d can be signed (and thus contain a respective RSIG record 26a), or can be unsigned (and thus not contain a respective RRSIG record 26a). It is also recognized that, as shown by example in FIG. 2, that each set of DNS data 34 (e.g. also referred to as a set of DNS records or RR transfer set or RR transaction set) can contain one or more RR set(s) 26d. Also, preferably, each set of DNS data 34 only contains one RR set 26d for a particular resource record type 26c (e.g. signed or unsigned).

In view of the above, it is recognized that utilization of the DNS data 34, via the DNS 30, can facilitate determination by a security-aware DNS resolver (the one or more network server(s) assisting the network user 13 in navigating to the network 11 (e.g. IP) address the user wishes to access—i.e. for interaction with the respective network resource(s) 31) if a) the answer (to a DNS lookup request) the resolver server received was correct (i.e. secure), b) whether the DNS server 32 for the domain being queried doesn't support DNSSEC (insecure), or c) if there is some sort of error with the answer obtained from the DNS server 32. Further, it is recognized that that, in general, the DNS data 34 published to the DNS 30 is useful in facilitating that the correct DNSKEY record can be found via an Authentication Chain, starting with a known good public key for a Trust Anchor, preferably at the DNS root. This public key can then be used by the respective servers (e.g. resolver server) to verify a delegation signer (DS) record associated with the respective domain name 14 of interest to the network user 13. For example, a DS record in a parent domain (DNS zone) can then be used to verify a DNSKEY record in a subdomain, which can then contain other DS records to verify further subdomains.

In view of the above, it is recognized that the registry data 23, some of which can be obtainable from the registry database 18 for the particular domain name 14, can be pertinent to the resource records 26 such as but not limited to: A Records 26—which are the most basic type of DNS record and are used to point a domain or subdomain to an IP address (e.g. assigning a value to an A record is associated with an IP address to where the domain or subdomain should point and a TTL; CNAME records 26—which are used to point a domain or subdomain to another hostname, for example as a means of being able to change an IP address of a server or cluster of servers; Mail Exchanger (MX) records 26—which are used to help route email according the domain owners preference, such that the MX record itself specifies which server(s) to attempt to use to deliver mail to when this type of request is made to the domain; and TXT records—which are used to store any text-based information, for example used to hold SPF data and verify domain ownership. Other registry data 23 pertinent to resource records 26 can include: a NS record 26—storing the name server for a DNS entry; DNSKEY record 26—the 'DNS Key Record' contains a public key used to verify signatures; CDNSKEY record 26—a child copy of the DNSKEY record, meant to be transferred to a parent; CERT record 26—the 'certificate record' stores public key certificates; DCHID record 26—the 'DHCP Identifier' stores info for the Dynamic Host Configuration Protocol (DHCP), a standardized network protocol used on IP networks; DNAME record 26—the 'delegation name' record creates a domain alias, just like CNAME, but this alias will redirect all subdomains as well; HIP record 26—uses 'Host identity protocol', a way to separate the roles of an IP address used most often in mobile computing; IPSECKEY record 26—The 'IPSEC key' record works with the Internet Protocol Security (IPSEC), an end-to-end security protocol framework and part of the Internet Protocol Suite (TCP/IP); and SSHFP record 26—storing the 'SSH public key fingerprints', SSH stands for Secure Shell and it's a cryptographic networking protocol for secure communication over an unsecure network. In general, it is recognized that only unsigned registry data 23 is contained in the registry database 18.

Further, is also recognized that those resource records 26 of the DNS data 34,34a that are DNSSEC related, e.g. the RRSIG record 26a, the DS record 26, the DNSKEY records 26, etc. are also not stored in the registry database 18. As such, the resource records 26 of the DNS data 34 that are DNSSEC related can already be known to the DNS publication service 22 (e.g. to the signing system 204 and/or the distribution system 202 as per the provisioning 107 of the generation instructions 105,105a), in advance of receiving (or otherwise obtaining) the relevant registry data 23 from the registry database 18 in order to perform the generation of the DNS data 34,34a (e.g. for the purposes of configuration of a new domain name 14 added to the domain/zone and/or an update to the DNS data 34,34a based on registry data 23 related transactions implemented by the registry operator 20 on the registry data 23 stored in the registry database 18). Also recognized is that the TTL parameter of the DNS data 34,34a can play a role in triggering an update to the DNS data 34, 34a, as performed by the DNS publication system 10.

Referring again to FIG. 2, DNSSEC was designed to deal with cache poisoning and a set of other DNS vulnerabilities such as man in the middle attacks and unauthorized data modification in authoritative servers. Its major objective is to provide origin authentication and integrity protection for the DNS data 34. The public key infrastructure (PKI) can be used as means of public key distribution for the signed RR set(s) 26d of the DNS data 34. DNSSEC provides a verification mechanism for the DNS data 34 and is not an encryption mechanism. It allows a security-aware resolver 35 (see FIG. 1) to verify that the zone data that has been received is signed by the administrator of the zone who holds the private key.

As discussed, a zone may have one or more key pairs, each of which includes private key and public key. The private keys may be stored securely in the DNS publication service 22 (e.g. in the HSM 204b—see FIGS. 3,4) and used to sign zone data (e.g. the DNS data 34). The public keys may be stored in the DNS publication service 22 and also stored in the signed DNS data 34 as DNSKEY resource records. The public keys are used to verify zone data. DNSKEY records typically have the following data elements: Flags—"Zone Key" and "Secure Entry Point"; Protocol—fixed value of 3 (for backwards compatibility); Algorithm—the public key's cryptographic algorithm; and Public key—public key data. A DNSKEY Resource Record ("RR") may be either a Zone Signing Key (ZSK) or a Key Signing Key (KSK). The Key Signing Keys (KSKs) will have a SEP flag set so that they can be distinguished from the ZSKs in the DNSKEY RRset. The Key Signing Keys (KSKs) are used to sign other DINSKEY resource records and are used to build a chain of authority to the data that is validated.

The RRSIG resource record 26a (see FIG. 2) holds the DNSSEC signature of a resource record set RRset 26d (one or more DNS records 26 with the same name, class, and type). DNSSEC enabled resolvers 35 (see FIG. 1) can verify the signature with a public key stored in the DNSKEY-record. The RRSIG records can have the following data elements: Type Covered—DNS record type that this signature covers; Algorithm—cryptographic algorithm used to create the signature; Labels—number of labels in the original RRSIG-record name (used to validate wildcards); Original TTL—TTL value of the covered record set; Signature Expiration—when the signature expires; Signature Inception—when the signature was created; Key Tag—a short numeric value which can help quickly identify the DNSKEY-record which can be used to validate this signature; Signer's Name—name of the DNSKEY-record which can be used to validate this signature; and Signature—cryptographic signature. Further, it is recognized that the DNSKEY RRs can be signed by both active KSKs and ZSKs. Other RR sets can be signed by only active ZSKs.

The NSEC resource record 26 can list two separate things: the next owner name (in the canonical ordering of the zone) that contains authoritative data or a delegation point NS RRset 26d, and the set of RR types 26c present at the NSEC RR's owner name. The complete set of NSEC RRs 26 in a zone indicates which authoritative RR sets 26d exist in a zone and also form a chain of authoritative owner names in the zone. These resource records 26 can be used by resolvers 35 to verify the non-existence of a record name and type 26c as part of DNSSEC validation. NSEC-records can have the following data elements: Next domain name—the next record name in the zone (DNSSEC sorting order); and Record types—the DNS record types 26c that exist for the name of this NSEC-record.

The NSEC3 Resource Record (RR) 26 can provide authenticated denial of existence for DNS RR sets 26d. The NSEC3 RRs 26 have the same functionality as NSEC RR 26, except NSEC3 uses cryptographically hashed record names to prevent enumeration of the record names in a zone. An NSEC3-record can link to the next record name in the zone (in hashed name sorting order) and can list the record types 26c that exist for the name covered by the hash value in the first label of the NSEC3-record's own name. These resource records 26 of the DNS data 34 can be used by the resolvers 35 to verify the non-existence of a record name and type as part of DNSSEC validation. NSEC3-records 26 can have the following data elements: Hash Algorithm—the cryptographic hash algorithm used; Flags—"Opt-out" (indicates if delegations are signed or not); Iterations—how many times the hash algorithm is applied; Salt—salt value for the hash calculation; Next Hashed Owner Name—the name of the next record in the zone (in hashed name sorting order); and Record Types—the record types 26c that exist for the name covered by the hash value in the first label of the NSEC3-record's own name.

Method 300

Figure 4:
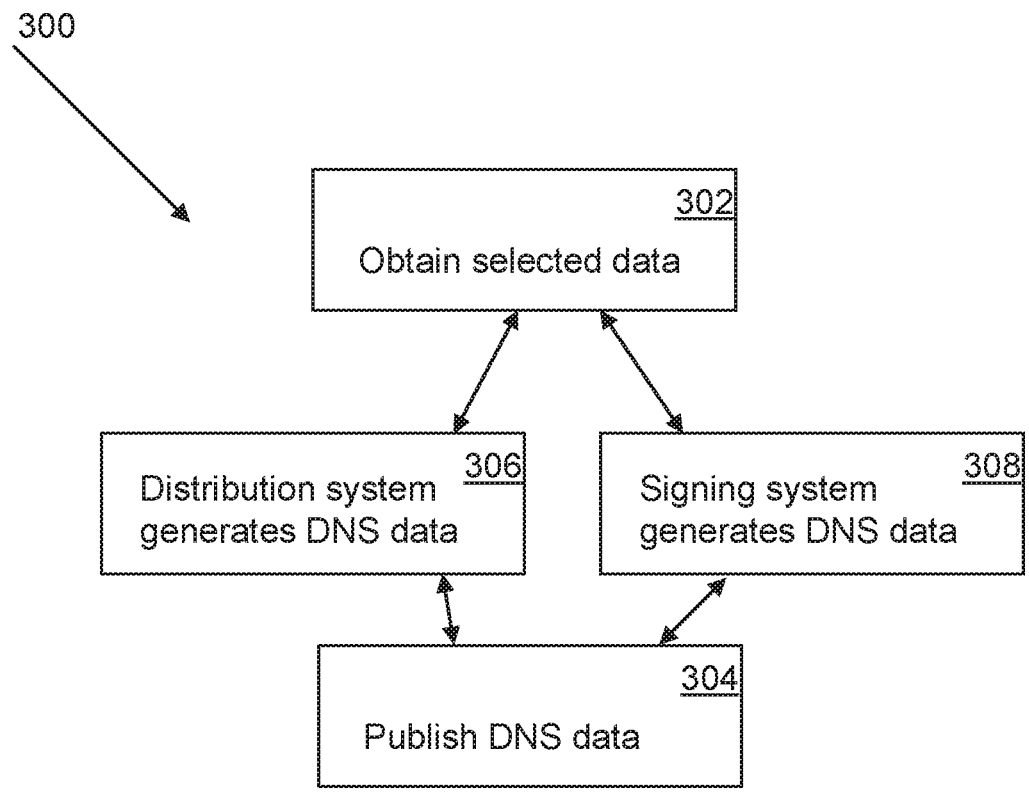
FIG. 4 is an example implementation of the DNS publication service of FIG. 3.

Referring to FIG. 4, shown is a method 300 for signing the plurality of Domain Name System (DNS) records 34a,34a for the domain name 14, whether for the version DNS data 34 or the next version DNS data 34a. It is recognised that the same signing method 300 embodiment can be used in order to sign resource records 26 in the live version DNS data 34 as well as in the next version DNS data 34a. It is also recognised that different signing method 300 embodiments can be used in order to sign resource records 26 in the live version DNS data 34 as compared to those in the next version DNS data 34a. It is recognised that in either case, the live version DNS data 34 or the next version DNS data 34a, the respective different signing key(s) SK1, SK2 are used.

In general, the method 300 comprises a step 302 of obtaining by a record selection module 200 selected data of registry data 23 associated with the domain name 14 in the registry database 18; a further step 304 of implementing the signing system 204 and/or the distribution system 202 for coordinating the publishing/storing of the set of DNS data 34,34a (e.g. in the DNS 30 or the publication storage 19) in a respective transmission path 11a,11b that bypasses storing of the signed DNS record in the registry database 18, the set of DNS records 34,34a generated based on a signing identifier 110,110a (designating the selected data as to be signed by the respective SK1,SK2 or not signed) on how to generate the set of DNS records 34,34a by either:
- a) sending 306 the selected data to the DNSSEC signing system 204 for subsequent direct inclusion as the signed DNS record in the set of DNS records 34,34a by the DNSSEC signing system 204 using the set of generation instructions 105,105a; and/or
- b) including 308 the selected data as an unsigned DNS record in the set of DNS records 34 by the distribution system 202 using the set of generation instructions 105,105a wherein the transmission path 11a,11b also bypasses the at least one signing module 204b of the DNSSEC signing system 204.

As discussed above, the DNSSEC signing system 204 has at least one signing module 204b,205b for digitally signing the selected data of the registry data 23, the digitally signing using one or more signing keys (SK1, SK2) to generate a signed DNS record, the one or more signing keys associated with the registry data 23 of the domain name 14. For example, the unsigned DNS record can be a Name Server (NS) record. For example, the signed DNS record can be a Delegation Signer (DS) record. For example, the set of DNS records 34,34a with the signed DNS record also includes a public key of the one or more signing keys as a DNSKEY record.

In terms of step 306, the distribution system 202 can consult the signing identifier 110,110a before sending of the selected data of the registry data 23 to the DNSSEC signing system 204. It is also recognised that the record selection module 200 can be incorporated as part of the distribution system 202.

As an option in step 306, the distribution system can generate a checklist 27 for separating the selected data into a first portion of the registry data 23 and a second portion of the registry data 23, the first portion of the registry data 23 for inclusion in the set of DNS records 34,34a as unsigned records and the second portion of the registry data 23 for inclusion in the set of DNS records 34,34a as signed records, the distribution system 202 sending the checklist 27 with the selected data to the DNSSEC signing system 204.

As an option in step 308, the DNSSEC signing system 204 can incorporate the first portion of the registry data 23 in the set of DNS records 34 in a path that bypasses the at least one signing module 204b,205b and incorporates the second portion of the registry data 23 in the set of DNS records 34,34a using one or more digital signatures as obtained from the at least one signing module 204b,205b.

As an option in step 308, the DNSSEC signing system 204 can generate a checklist 27 for separating the selected data into the first portion of the registry data 23 and the second portion of the registry data 23, the first portion of the registry data 23 for inclusion in the set of DNS records 34,34a as unsigned records and the second portion of the registry data 23 for inclusion in the set of DNS records 34,34a as signed records.

As an option in step 308, the DNSSEC signing system 204 can incorporate, e.g. using the checklist 27, the first portion of the registry data 23 in the set of DNS records 34,34a in a path that bypasses the at least one signing module 204b,205b and incorporates the second portion of the registry data 23 in the set of DNS records 34,34a using one or more digital signatures as obtained from the at least one signing module 204b,205b.

Signing Identifiers 110,110a

As noted above, the signing identifier 110,110a can be defined as a presence of a DNSSEC record in the set of generating instructions 105,105a used to generate the set of DNS records 34,34a (e.g. live version using SK1 and/or next version using SK2), the DNSSEC record for containing the signed DNS record when generated by the at least one signing module 204b,205b. For example, the signed DNS record can be a Resource Record Signature record (RRSIG), such that the presence of the DNSSEC record (as the signing identifier 110,110a) would be the presence of a resource record field in the RR set 26d for containing the RRSIG once generated. Using FIG. 2 as an example, the signing identifier 110,110a can be assigned to each resource record type 26c that is defined to include the RRSIG record 26a of the signed version of the RR set 26d for the respective selected data of the registry data 23 (e.g. the second portion of the registry data 23). Therefore, for example, the presence of the RRSIG record field of the RR set 26d in the generating instructions 105,105a can be defined as the signing identifier 110,110a identifying which of the signing key(s) Sk1,SK2 to utilize. In other words, the record generation module 204a,205a, when following the generating instructions 105,105a would note the presence of the RRSIG record field (as one example of the signing identifier 110,110a) for a particular resource record type 26c and thus instruct the at least one signing module 204b,205b to generate a signature using the respective set of signing keys SK1,SK2 designated for the domain name 14 and the respective live/next version of the DNS data 34,34a. It is also recognized that the presence of other DNSSEC records 106,106b (e.g. DS record, DNSKEY, etc.) in the generating instructions 105,105a can be used as indication by the record generation module 204a,205a that the DNS data 34,34a should contain signed DNS records 26.

In the general case where there is an absence of any DNSSEC records 26 in the generating instructions 105,105a the record generation module 204a,205a can use this absence of any DNSSEC record fields pertaining to the RR sets 26d (for the domain name 14) to indicate that the particular DNS record is an unsigned DNs record 26. Therefore, for example, the absence of the RRSIG record field of the RR set 26d in the generating instructions 105,105a can be defined as the signing identifier 110,110a (i.e. indicating the unsigned designation for the respective DNS records 26—e.g. resource record type(s) 26c). In other words, the record generation module 204a,205a, when following the generating instructions 105,105a would note the absence of the RRSIG record field (as one example of the signing identifier 110,110a) for a particular resource record type 26c and thus not instruct the at least one signing module 204b,204b to generate a signature using the set of signing keys SK1,SK2 designated for the domain name 14. It is also recognized that the absence of other DNSSEC records (e.g. DS record, DNSKEY, etc.) in the generating instructions 105,105a can be used as indication by the record generation module 204a,205a that the DNS data 34 should contain one or more unsigned DNS records 26.

It is also recognized that the signing identifier 110,110a can be embodied as a defined identifier that is other than presence/absence of DNSSEC records in the generating instructions 105, 105a. For example, the signing identifier 110,110a can be a defined signing flag (something other than a defined DNSSEC record type incorporated in one or more of the RR set records 26d of the DNS data 34,34a associated with none, or one or more resource record types 26c in the generating instructions 105,105a). Accordingly, the embodiment of the flag (e.g. indicated signed vs unsigned as well as which signing key(s) Sk1,Sk2 to use in the case of signed) used as the signing identifier 110,110a is such that the flag value, and/or the flag field itself, is not explicitly included in the RR set records 26*d* of the DNS data 34,34*a*. As such, the flag/flag field is defined outside of and record field(s) and/or record field values contained in the DNS data 34,34*a*.

For example, the defined signing flag (as the signing identifier 110,110*a*) can be a flag containing a "signed designation—SK1", "signed designation—SK2" or an "unsigned designation" for the DNS record(s) 26 pertaining to the domain name 14. For example, for an unsigned domain, the signing identifier can be one or more flags for the entire set of registry data 23 (pertaining to the DNS records for the domain name 14) in order to indicate which of the DNS record(s) 26 should be signed/unsigned.

A further example, the defined signing flag (as the signing identifier 110,110*a*) can be a flag containing a "signed designation" for the entire domain pertaining to the domain name 14. For example, for the signed domain, the signing identifier can be a single flag for the entire set of registry data 23 (pertaining to the DNS records for the domain name 14) in order to indicate the domain name 14 as a signed domain (i.e. having the presence of a plurality of DNSSEC related records in the DNS data 34,34*a* for all of the respective resource record types 26*c*).

A further example, the defined signing flag (as the signing identifier 110,110*a*) can be a respective flag of a plurality of flags containing a "signed designation" for each of the resource record types 26*c* in the entire domain pertaining to the domain name 14. For example, for the signed domain, the signing identifier can be a respective flag assigned on per resource record type 26*c* basis for the entire set of registry data 23 (pertaining to the DNS records for the domain name 14), in order to indicate the domain name 14 as a signed domain (i.e. having the presence of a plurality of DNSSEC related records for at least one resource record type 26*c* in the DNS data 34,34*a*).

If DNSKEYS are established in the signing system, the mere presence of the keys for a particular zone. It is recognized that one or more of the record types can be signed/unsigned in the zone pertaining to the keys associate with the zone in the instructions (e.g. as one embodiment of the signing identifier 110).

The method 300 can also include the optional step 310 of modifying the signing identifier 110 by changing from a first signed designation to a second signed designation (e.g. based on a decision of the registrant 12 and/or registrar 16 to go from SK1 to SK2). Step 310 can include a receipt module (e.g. the record selection module 200) for receiving a request to change the signing identifier 110,110*a* and for facilitating the changing of the signing identifier 110,110*a* in the generating instructions 105,105*a* from the first signed designation to the second signed designation.

The method 300 can also include the optional step 310 of modifying the signing identifier 110,110*a* by changing from a second signed designation to a first signed designation. (e.g. based on a decision of the registrant 12 and/or registrar 16 to go from SK2 to SK1, for example in the case where a previously implemented change from SK1 to SK2 in the live version DNS data 34 is subsequently reversed). Step 310 can include a receipt module (e.g. the record selection module 200) for receiving a request to change the signing identifier 110,110*a* and for facilitating the changing of the signing identifier 110,110*a* in the generating instructions 105,105*a* from the second signed designation to the first signed designation.

The changing can be implemented by (e.g. an administrator of the DNS publication service 22): inhibiting the transmission of the set of DNS records 34,34*a* (e.g. disabling operation of the publication module 202*b*); provisioning a new set of generation instructions 105,105*a* to include the first signed/second signed designation change (e.g. second signed to first signed or first signed to second signed); and reenabling the transmission of the set of DNS records 34 (reestablishing operation of the publication module 202*a*).

Once the signing identifier 110,110*a* change has been accomplished, (i.e. the generation instructions 105 have been provisioned to incorporate the identifier change), the step 306 of the distribution system 202 can be further triggered to: obtain a further instance of the selected data of the registry data 23; and send the further instance to the DNSSEC signing system 204 in order for the further instance of the registry data 23 to be used to generate a further signed DNS record 26 using the at least one signing module 204*b*,205*b* (e.g. changing the selected data in the DNS data 34,34*a* to second signed what was previously first signed). For example, this alternative embodiment can be implemented for one or more resource record types 26*c*.

Once the signing identifier 110,110*a* change has been accomplished, (i.e. the generation instructions 105 have been provisioned to incorporate the identifier change), the step 306 of the distribution system 202 can be further triggered to: obtain a further instance of the selected data of the registry data 23; and send the further instance to the DNSSEC signing system 204 in order for the further instance of the registry data 23 to be used to generate a further signed DNS record 26 using the at least one signing module 204*b*,205*b* (e.g. changing the selected data in the DNS data 34,34*a* to first signed what was previously second signed). For example, this alternative embodiment can be implemented for one or more resource record types 26*c*.

Finally, the further set of DNS records 34 is published in the DNS 30 by sending the further set of DNS records 34 to the one or more authoritative servers 32 of the DNS 30 (or to the publication storage 19 as dictated by the publication identifiers 39,39*a*) by the DNS publication system 22, the further set of DNS records including the further second signed (or first signed) DNS record 26.

Accordingly, the DNS publication system 22, with the option to use the signing system 204 for signing key(s) SK1,SK2 concurrently, and further with the option to use or not use the signing module 204*b*, 205*b*, can be utilized flexibly as a gateway by the registry operator 20 (or in connection with the registrant 12 and/or the registrar 16) to provide (and to straightforwardly change) first signed records to second signed records (SK1 to SK2 of the DNS data 34) on a per domain basis, as dictated using the publication identifiers 39,39*a* described by example.

As described above, the publication system 10 for concurrently publishing a live version 34 of a plurality of Domain Name System (DNS) records 26 for a domain name 14 and for storing a next version 34*a* of the plurality of DNS records 26 for the domain name 14 can be configured to include: a record selection module 200 for obtaining selected data 23 of registry data 23 associated with the domain name 14 stored in a registry database 18; a DNS Security (DNSSEC) signing system 204 having at least one signing module 204*b*,205*b* for digitally signing the selected data 23 of the registry data 18, the digitally signing using one or more signing keys (SK1,SK2) to generate a signed DNS record 26, the one or more signing keys associated with the registry data 23 of the domain name 18; a distribution system 202 for coordinating con generation and transmission of the live version 34 and the next version 34*a* based on one or more publication identifiers 39,39*a* (designating the version 34,34*a* as "to be published" or "not published"), at least one of the live version 34 and the next version 34*a* including one or more signed DNS records SR based on one or more signing identifiers 110,110a (designating the record 26 as to be signed/not signed with the designated SK1,Sk2 where appropriate) as generated by the DNSSEC signing system 204; the distribution system 202 and signing system 204 cooperating to: 1) generate the live version 34 according to a first set of generation instructions 105 and transmit according to one or more publication identifiers 39 the live version 34 to one or more authoritative servers 32 of the DNS 30 in a first transmission path 11a that bypasses storing of the live version 34 in the registry database 18; and 2) generate the next version 34a according to a second set of generation instructions 105a and transmit according to the one or more publication identifiers 39a the next version 34a to a publication storage 19 in a second transmission path 11b that bypasses storing of the next version 34a in the registry database 18; wherein the live version 34 and the next version 34a contain different applied signing key(s) SK1,SK2, respectively, to the plurality of DNS records 26 such that the signing key(s) SK1 contained in the live version DNS data 34 is not contained in the live version DNS data 34a, as the next version DNS data 34a contains the signing key(s) SK2, the signing key SK1 different from the signing key(s) SK2.

Figure 5:
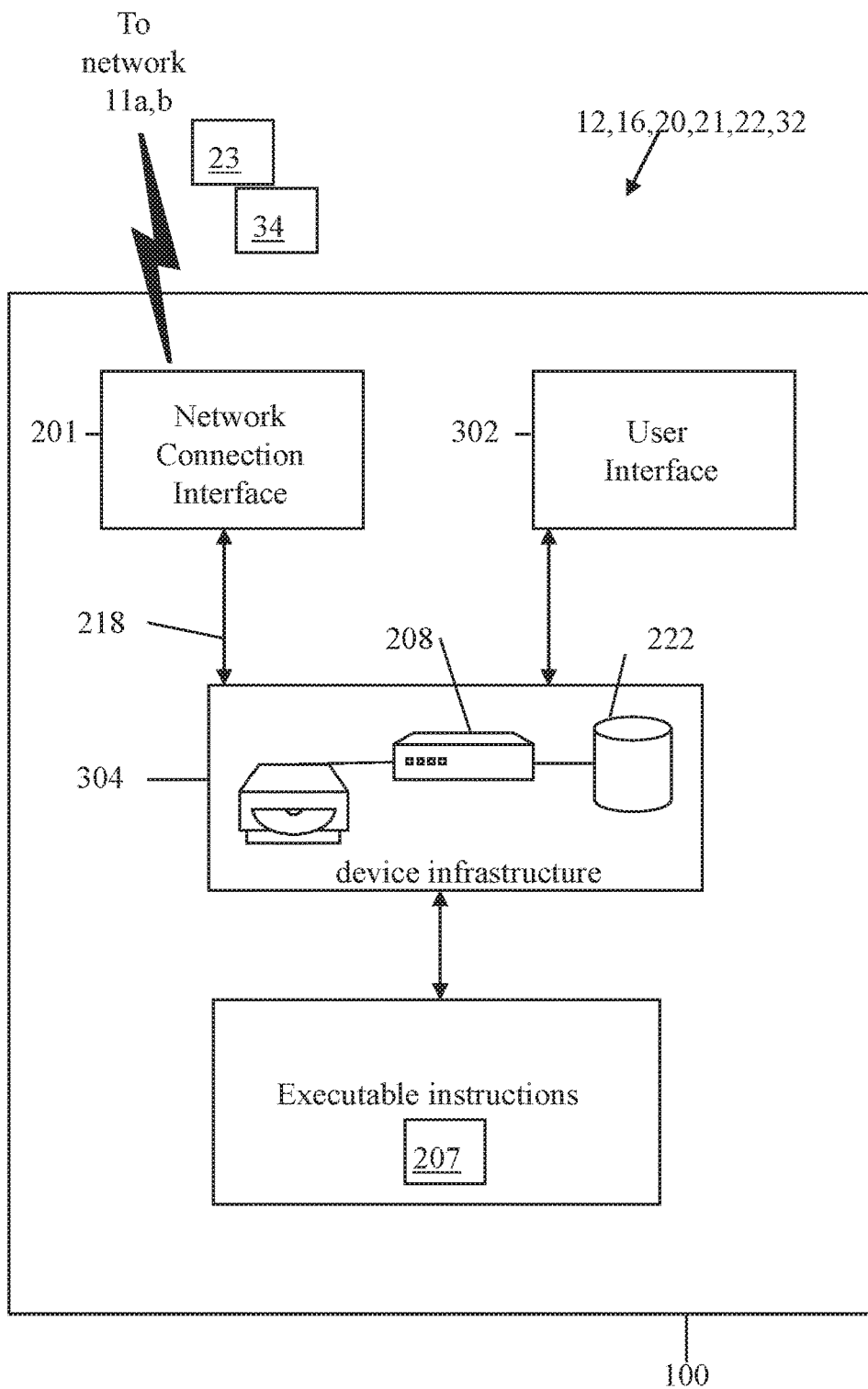
FIG. 5 is an example block diagram of computing devices implementing one or more components of the system of FIG. 1.

Referring to FIG. 5, shown is such that operation of the device 100 is facilitated by the device infrastructure 304. The device infrastructure 304 includes one or more computer processors 208 and can include an associated memory 222 (e.g. database 18,19). The computer processor 208 facilitates performance of the device 100 configured for the intended task (e.g. of the respective module(s) 200, 202, 204) through operation of the network interface 201, the user interface 302 and other application programs/hardware of the device 100 by executing task related instructions. These task related instructions can be provided by an operating system, and/or software applications located in the memory 222, and/or by operability that is configured into the electronic/digital circuitry of the processor(s) 208 designed to perform the specific task(s). Further, it is recognized that the device infrastructure 304 can include a computer readable storage medium coupled to the processor 208 for providing instructions to the processor 208 and/or to load/update the instructions 207 (e.g. modules 200, 202, 204 and/or instructions 105, 105a). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.267

Further, it is recognized that the computing device 100 can include the executable applications comprising code or machine readable instructions for implementing predetermined functions/operations including those of an operating system and the modules, for example. The processor 208 as used herein is a configured device and/or set of machine-readable instructions for performing operations as described by example above, including those operations as performed by any or all of the modules. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the modules may be implemented in hardware, software or a combination of both. Accordingly, the use of a processor 208 as a device and/or as a set of machine-readable instructions is hereafter referred to generically as a processor/module 208 for sake of simplicity. 269

It will be understood in view of the above that the computing devices 100 may be, although depicted as a single computer system, may be implemented as a network of computer processors, as desired.

What is claimed is:

1. A system for concurrently publishing a current version of a plurality of Domain Name System (DNS) records for a zone of domain name and for storing a next version of the plurality of DNS records for the zone, the system comprising:
   a record selection module for obtaining registry data associated with the domain name stored in a registry database;
   a DNS Security (DNSSEC) signing system having one or more signing modules for digitally signing the registry data to generate a first signed DNS record using a first signing key (SK1) and digitally signing the registry data to generate a second signed DNS record using a second signing key SK2, the SK1 different from the SK2; and
   a distribution system for coordinating concurrent generation and transmission of the current version and the next version;
   the distribution system and signing system cooperating to:
   a) generate the concurrent version using SK1 to include the first signed DNS record according to a first set of generation instructions and transmit the concurrent version to one or more authoritative servers of the DNS in a first transmission path that bypasses storing of the current version in the registry database; and
   b) while the current version is operational in the DNS, generate the next version using SK2 to include the second signed DNS record according to a second set of generation instructions and transmit the next version to a publication storage for at least one of testing or validation by a processing facility in a second transmission path that bypasses storing of the next version in the registry database;
   wherein the current version in the DNS and the next version in the publication storage contain different versions of at least some of the plurality of DNS records by using SK1 in the current version and SK2 in the next version.

2. The system of claim 1, wherein the next version only contains signature records using the SK2 and does not contain signature records using SK1, the next version being update DNS data for the DNS once published, such that the update data becomes the current version operating in the DNS.

3. The system of claim 2 further comprising using both SK1 and SK2 to generate at least one intermediate version between the current version and the update DNS data, such that the at least one intermediate version is published to the DNS before the update DNS data is published to the DNS.

4. The system of claim 1, wherein multiple stages are used by the distribution system to iteratively generate the next version by generating one or more intermediate version.

5. The system of claim 1, wherein the next version is generated iteratively using a first stage and a second stage, such that the first stage is separated from the second stage by a hold down period.

6. The system of claim 5, wherein the first stage generates and subsequently publishes a first intermediate version as first iteration DNS data and the second stage generates subsequently publishes a second generation DNS data as a second intermediate version.

7. The system of claim 6, wherein the second iteration DNS data is update DNS data as a final version as the next version.

8. The system of claim 5, wherein the first stage includes successful testing of the first iteration DNS data prior to publishing the first iteration DNS data to the DNS.

9. The system of claim 5, wherein the second stage includes successful testing of the second iteration DNS data prior to publishing the second iteration DNS data to the DNS.

10. The system of claim 1, wherein next version is a replacement of the current version and thus becomes the current version for subsequent operation of the DNS.

11. The system of claim 1, wherein one or more signing identifiers are included in at least one of the first set of generation instructions and the second set of generation instructions.

12. The system of claim 1, wherein one or more publication identifiers are included in at least one of the first set of generation instructions and the second set of generation instructions.

13. The system of claim 11, wherein the distribution system consults the one or more signing identifiers before sending of the selected data to the DNSSEC signing system.

14. The system of claim 12 further comprising modifying the one or more publication identifiers in order designate transmission of the next version from the publication storage to the one or more authoritative servers of the DNS using the first transmission path.

15. The system of claim 12, wherein the one or more publication identifiers includes an enable publication pointer facilitating said transmit of the live version.

16. The system of claim 12, wherein the one or more publication identifiers includes an enable publication flag facilitating said transmit of the live version.

17. The system of claim 11, wherein the one or more signing identifiers are changed in order to designate transmission of the next version from the publication storage to the one or more authoritative servers of the DNS as update DNS data using the first transmission path.

18. The system of claim 11 further comprising a receipt module for receiving a request to change the one or more signing identifiers.

19. The system of claim 1, wherein the storage is a registry having the domain name as one of a plurality of domain names stored in the registry.

20. A method for concurrently publishing a current version of a plurality of Domain Name System (DNS) records for zone of a domain name and for storing a next version of the plurality of DNS records for the zone, the method comprising the steps of:
obtaining selected data of registry data associated with the domain name stored in a registry database;
digitally signing the registry data to generate a first signed DNS record using a first signing key (SK1) and digitally signing the registry data to generate a second signed DNS record using a second signing key SK2, the SK1 different from the SK2; and
a distribution system for coordinating concurrent generation and transmission of the current version and the next version;
the distribution system and signing system cooperating to:
 a) generate the current version to include the first signed DNS record according to a first set of generation instructions and transmit the current version to one or more authoritative servers of the DNS in a first transmission path that bypasses storing of the current version in the registry database; and
 b) while the current version is operational in the DNS, generate the next version the second signed DNS record according to a second set of generation instructions and transmit the next version to a publication storage in a second transmission path that bypasses storing of the next version in the registry database;
wherein the current version in the DNS and the next version in the publication storage contain different versions of at least some of the plurality of DNS records by using SK1 in the current version and SK2 in the next version.

* * * * *